US008879516B2

(12) United States Patent
Liu et al.

(10) Patent No.: US 8,879,516 B2
(45) Date of Patent: Nov. 4, 2014

(54) EFFICIENT FORMATS OF BEACON, ANNOUNCEMENT, AND BEAMFORMING TRAINING FRAMES

(75) Inventors: Yong Liu, Santa Clara, CA (US); Hongyuan Zhang, Fremont, CA (US); Raja Banerjea, Sunnyvale, CA (US); Harish Ramamurthy, Sunnyvale, CA (US); Hui-Ling Lou, Sunnyvale, CA (US)

(73) Assignee: Marvell World Trade Ltd, St. Michael (BB)

( * ) Notice: Subject to any disclaimer, the term of this patent is extended or adjusted under 35 U.S.C. 154(b) by 498 days.

(21) Appl. No.: 12/624,101

(22) Filed: Nov. 23, 2009

(65) Prior Publication Data
US 2010/0157955 A1 Jun. 24, 2010

Related U.S. Application Data

(60) Provisional application No. 61/121,397, filed on Dec. 10, 2008, provisional application No. 61/143,895, filed on Jan. 12, 2009.

(51) Int. Cl.
*H04W 72/04* (2009.01)
*H04W 74/00* (2009.01)
*H04W 48/12* (2009.01)
*H04B 7/06* (2006.01)

(52) U.S. Cl.
CPC ............ *H04W 74/002* (2013.01); *H04W 48/12* (2013.01); *H04B 7/0617* (2013.01)
USPC ......................................................... 370/336

(58) Field of Classification Search
None
See application file for complete search history.

(56) References Cited

U.S. PATENT DOCUMENTS

| 2008/0205340 | A1  | 8/2008 | Meylan et al. |
| 2008/0225768 | A1* | 9/2008 | Wentink ........................ 370/311 |
| 2009/0232106 | A1* | 9/2009 | Cordeiro et al. ............. 370/336 |
| 2009/0233549 | A1* | 9/2009 | Maltsev et al. ............. 455/41.2 |
| 2010/0056062 | A1  | 3/2010 | Zhang et al. |

FOREIGN PATENT DOCUMENTS

| WO | WO-03/051077 A1 | 6/2003 |
| WO | WO-2008/115018 A1 | 9/2008 |

OTHER PUBLICATIONS

IEEE Std 802.15.3™ IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs) *The Institute of Electrical and Electronics Engineers, Inc.*, Sep. 2003.

International Search Report and Written Opinion for PCT/US2009/065531, mailed Jun. 10, 2010.

International Preliminary Report on Patentability for PCT/US2009/065531, mailed Jun. 14, 2011.

(Continued)

*Primary Examiner* — John Blanton
*Assistant Examiner* — Alan Lindenbaum

(57) ABSTRACT

A method includes generating a first data unit to be transmitted during a first time period to one or several stations assumed to be beamformed, including determining a time interval that separates the first time period from a second time period, such that a second data unit is transmitted during the second time period to one or several stations assumed to be beamformed, and generating a parameter indicative of the time interval, such that the first data unit includes the parameter.

16 Claims, 17 Drawing Sheets

(56) References Cited

OTHER PUBLICATIONS

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

S. A. Mujtaba, "IEEE P802.11—Wireless LANS, TGn Sync Proposal Technical Specification," *The Institute of Electrical and Electronics Engineers, Inc.*, doc.: IEEE 802.11-04/0889r6, May 2005.

"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).

\* cited by examiner

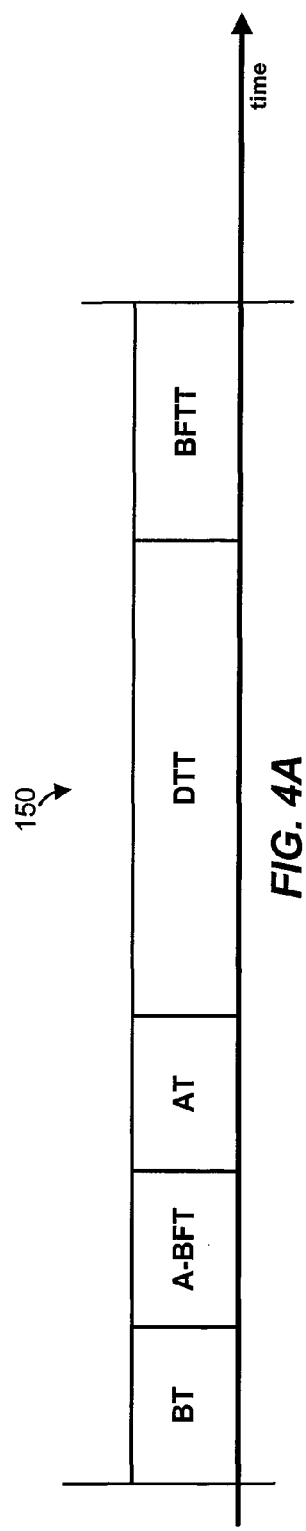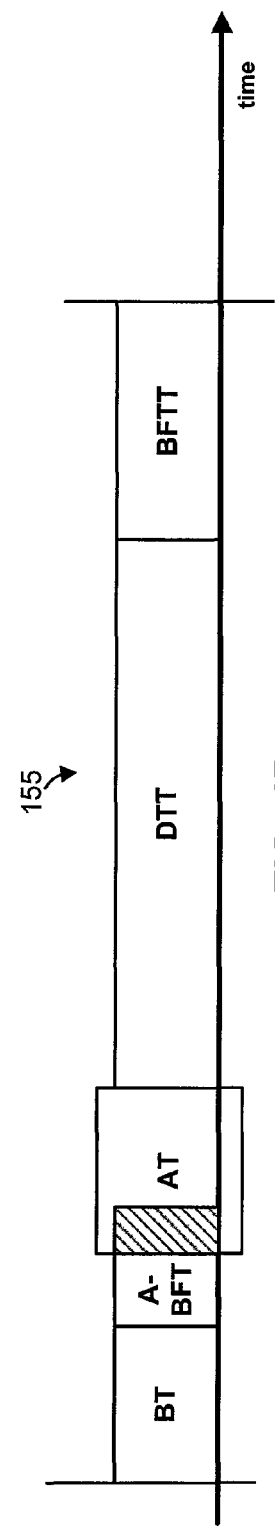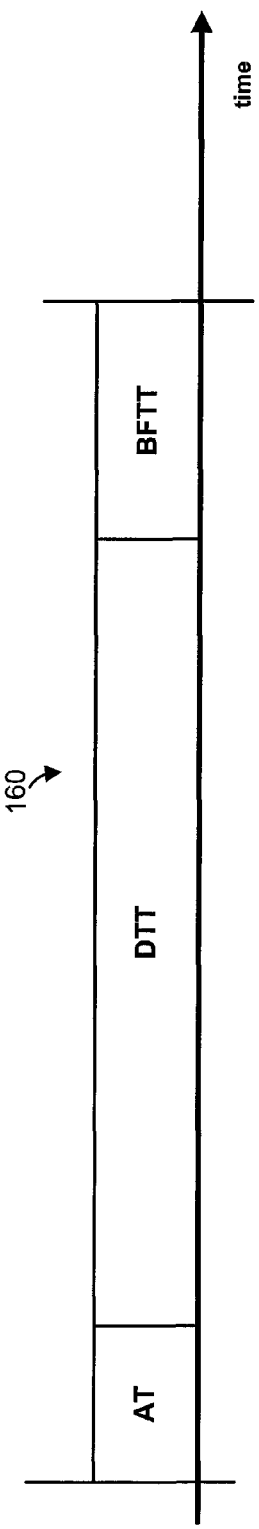

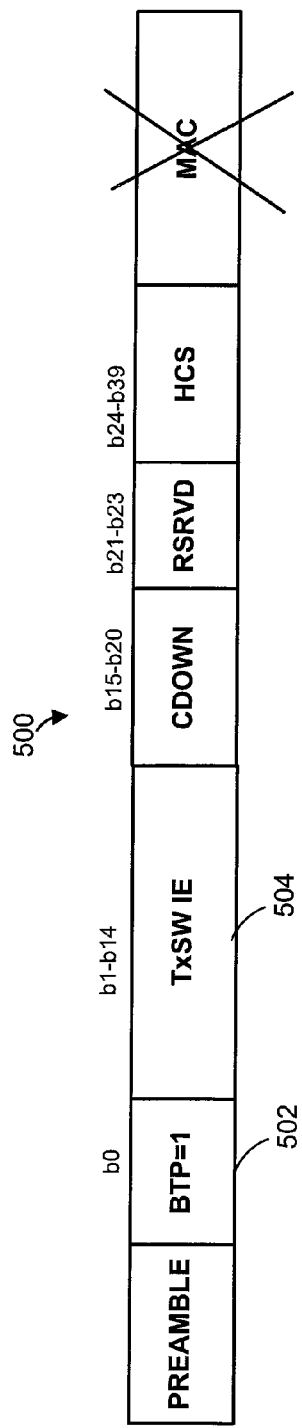
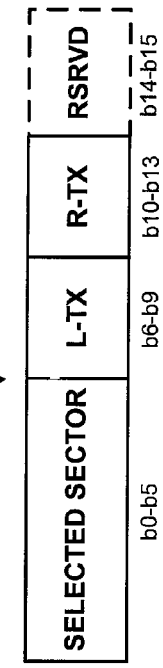
FIG. 7A
FIG. 7B
FIG. 7C

EFFICIENT FORMATS OF BEACON, ANNOUNCEMENT, AND BEAMFORMING TRAINING FRAMES

CROSS REFERENCE TO RELATED APPLICATION

This application claims the benefit of U.S. Provisional Patent Application Nos. 61/121,397, filed Dec. 10, 2008, and 61/143,895, filed Jan. 12, 2009, each of which is entitled "NGmS Frame Formats." The disclosures of both of the above applications are hereby expressly incorporated herein by reference.

FIELD OF TECHNOLOGY

The present disclosure relates generally to communication systems in which multiple devices transmit and receive data via a wireless communication channel and, more particularly, to formatting communication frames in such communication systems.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11n, and the IEEE draft standards 802.15.3, and 802.15.3c now in the process of being finalized, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a or the IEEE Standard 802.11n. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, transmission systems compliant with the IEEE 802.15.3c or future IEEE 802.11ad standards support one or both of a Single Carrier (SC) mode of operation and an Orthogonal Frequency Division Multiplexing (OFDM) mode of operation to achieve higher data transmission rates. For example, a simple, low-power handheld device can operate only in the SC mode, a more complex device that supports a longer range of operation can operate only in the OFDM mode, and some dual-mode devices may switch between SC and OFDM modes. Additionally, devices operating in such systems can support a control mode of operation at the physical layer of the protocol stack, referred to herein as "control PHY." Generally speaking, control PHY of a transmission system corresponds to the lowest data rate supported by each of the devices operating in the transmission system. Devices may transmit and receive control PHY frames to communicate basic control information such as beacon data or beamforming data, for example.

By transmitting beacon data, network devices such as piconet central points (PCPs) announce the presence of the network to devices not yet associated with the network. Devices can utilize the beacon data to become associated with the PCP.

As is known, antennas and, accordingly, associated effective wireless channels are highly directional at frequencies near or above 60 GHz. When multiple antennas are available at a transmitter, a receiver, or both, it is therefore important to apply efficient beam patterns using the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission.

U.S. patent application Ser. No. 12/548,393, filed on Aug. 26, 2009, and entitled "Beamforming by Sector Sweeping," and U.S. Provisional Patent Application No. 61/091,914 entitled "Beamforming by Sector Sweeping," filed Aug. 26, 2008, are both expressly incorporated by reference herein in their entireties. These applications are generally related to a beamforming technique referred to as "beamforming by sector sweeping." In one implementation of beamforming by sector sweeping for determining a transmit beamforming pattern to be applied by a first device when transmitting data to a second device, the first device transmits a plurality of training packets to the second device, where the first device applies a different beamforming pattern when transmitting each training packet. The second device generally determines which of the training packets had the highest quality (e.g., had the highest signal-to-noise ratio (SNR), the lowest bit error rate (BER), etc.) and notifies the first device. The first device can then utilize the transmit beamforming pattern that yielded the highest quality packet. Similarly, to determine a receive beamforming pattern to be applied by the first device when receiving data from the second device, the second device transmits a plurality of training packets to the first device, and the first device applies a different beamforming pattern when receiving each training packet. The first device generally determines which of the training packets had the highest quality, and can then utilize the receive beamforming pattern that yielded the highest quality packet.

Network devices can apply the techniques described above during dedicated timeslots to process real-time requests, or during beacon or association stages. Of course, communicating beacon and/or beamforming data during certain time intervals prevents network devices from transmitting useful data during these intervals. The transmission of beacons and beamforming data accordingly contributes to an overhead that reduces the effective throughput of the wireless channel. Further, the overhead increases with the number of sectors used in sector sweeping.

SUMMARY

In some embodiments, a method includes generating a first data unit to be transmitted during a first time period to one or several stations assumed to be beamformed, including determining a time interval that separates the first time period from a second time period, such that a second data unit is transmitted during the second time period to one or several stations assumed to be beamformed, and generating a parameter indicative of the time interval, such that the first data unit includes the parameter.

In some embodiments, a method for receiving data via a communication channel using a receiver includes processing a first announcement beacon received in a first timeslot of the communication superframe, where processing the first announcement beacon includes determining a next announcement time based on the announcement beacon, such that the next announcement time corresponds to a beginning of a second announcement beacon, determining a sleep interval based on at least the next announcement time, and generating a signal to deactivate the receiver for the duration of the sleep interval.

In some embodiments, an apparatus includes an allotment time (AT) generator to generate a first announcement beacon to be transmitted to one or several stations assumed to be beamformed during a first time period, and generate a second announcement beacon to be transmitted during a second time period, where the apparatus further includes a length estimation unit to determine a time interval that separates the first time period from the second time period, and generate a parameter indicative of the time interval, such that the first announcement beacon includes the parameter.

In some embodiments, a method includes generating reduced service capability data, such that the reduced service capability data is a portion of service capability data, generating a first communication frame for use by a station assumed to be unbeamformed to be transmitted during a first time period, where the first communication frame includes the reduced service capability data, and generating a second communication frame to be transmitted during a second time period in response to receiving a request from the station assumed to be unbeamformed, where the second communication frame includes a second portion of the service capability data.

In some embodiments, a method includes receiving a discovery beacon, where the discovery beacon includes a first portion of service capability data of a network and does not include a second portion of the service capability data, generating a probe request message in response to receiving the discovery beacon, and receiving a probe response message responsive to the probe request message, where the probe response message includes the second portion of the service capability data.

BRIEF DESCRIPTION OF THE DRAWINGS

FIG. 4A is a block diagram of an example superframe that includes a beacon time (BT) timeslot, an association beamforming training (A-BFT) timeslot, and an allotment time (AT) timeslot;

FIG. 4B is a block diagram of an example superframe that includes a BT timeslot, an A-BFT timeslot, and an AT timeslot dynamically re-scheduled to start before the completion of the A-BFT timeslot;

FIG. 4C is a block diagram of an example superframe that includes an AT timeslot but does not include a BT timeslot or an A-BFT timeslot;

FIG. 7A is a block diagram of an example beamforming training (BFT) frame that can be transmitted in a beamforming training time (BFTT) timeslot;

FIG. 7B is a block diagram of an example BFT frame that can be transmitted in a BT timeslot or an A-BFT timeslot;

FIG. 7C is a block diagram of example sector sweeping information that can be transmitted as a respective portion of the BFT frame illustrated in FIG. 7A and/or the BFT frame illustrated in FIG. 7B;

DETAILED DESCRIPTION

Figure 1A:
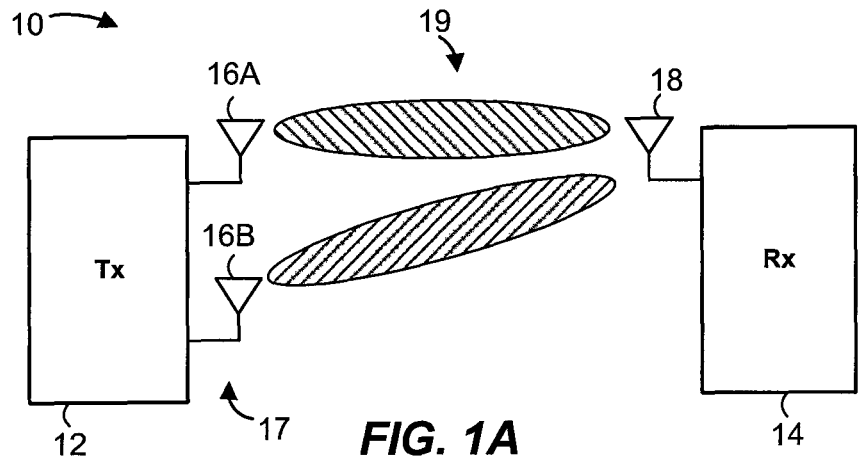
FIG. 1A is a block diagram of a communication system including a transmitter having multiple antennas and a receiver having a single antenna.
Figure 1B:
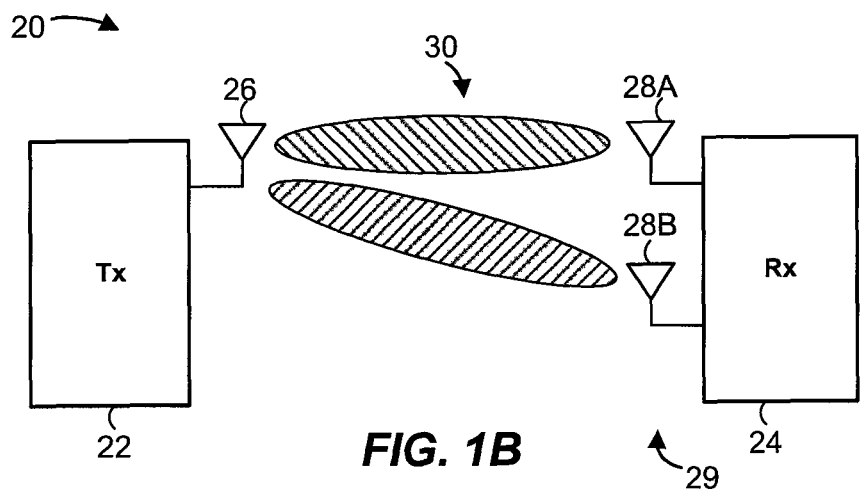
FIG. 1B is a block diagram of a communication system including a transmitter having a single antenna and a receiver having multiple antennas.
Figure 1C:
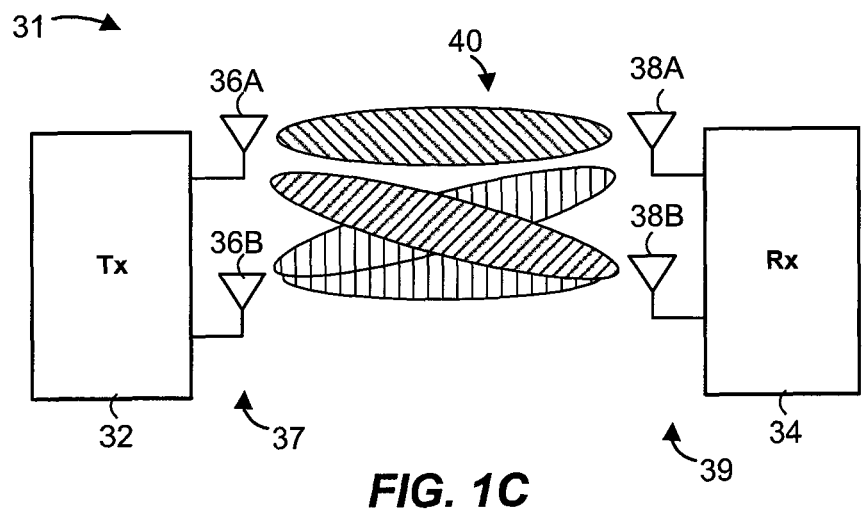
FIG. 1C is a block diagram of a communication system including a transmitter having multiple antennas and a receiver having multiple antennas.

FIGS. 1A-1C are block diagrams of several examples of communication systems that can use techniques for efficiently formatting communication frames to carry beacon data, scheduling data, and/or beamforming data discussed in more detail below. Also as discussed in detail below, devices operating in these or similar communication systems can significantly reduce the amount of information transmitted in at least some types of beacons. This may help to shorten the period of time required to transmit such a beacon, which may be useful when the beacon is transmitted at a low rate or when the beacon is transmitted multiple times in different directions, for example. Further, devices such as PCPs can transmit timing information (e.g., scheduling information) in certain beacons to allow devices already associated with the network to sleep through beacon timeslots and/or beamforming training timeslots that are intended for devices not yet associated with the network so that the already associated devices can thereby conserve power. Still further, the devices can reduce the amount of data transmitted in beamforming training (BFT) frames to further reduce the overhead associated with transmitting and receiving data via a wireless communication channel.

For simplicity, FIGS. 1A-1C illustrate systems in which only two devices are communicating with each other. However, as described further below, a system can also include more than two devices, and one device can communicate with several other devices. In any event, FIG. 1A illustrates a wireless communication system 10 in which a station or transmitting device 12 transmits information over a wireless communication channel to another station or receiving device 14. In general, the transmitted information can be in the form of one or more data units (e.g. packets, frames, etc). Each of the devices 12 and 14 can be a base station or a mobile station, for example. In the example of FIG. 1A, the transmitting device 12 is equipped with two or more antennas 16 defining an antenna array 17, while the receiving device 14 is equipped with a single antenna 18. The wireless communication system 10 is thus a multiple input, single output (MISO) system. For the purposes of simplicity and conciseness, the transmitting device 12 is illustrated with only two antennas 16A and 16B. However, it will be noted that the transmitting device 12 can generally have any desired number of antennas.

During transmission, the transmitting device 12 controls the phase and/or amplitude of a signal at each of the antennas 16A and 16B to define a radiation or gain pattern 19. Specifically with respect to controlling phases, the transmitting device 12 selects a steering vector (or "phasor") that specifies a set of phase shifting angles, and applies the steering vector to the antenna array 17 to thereby define a phased antenna array. The steering vector can specify a 0° phase shift for the antenna 16A and a 35° phase shift for the antenna 16B, for example. In this manner, the steering vector defines a direction of transmission or reception of the antenna array 17 that may be referred to as a "sector."

Similarly, a wireless communication system 20 (see FIG. 1B) is a single input, multiple output (SIMO) system that includes a station or transmitter 22 and a station or receiver 24, with the transmitter 22 having a single antenna 26 and the receiver 24 having multiple antennas 28 arranged in an antenna array 29. The transmitter 22 transmits a signal to the receiver 24 via the single antenna 26, and the receiver defines a gain pattern 30 by controlling phase shifting angles at the antennas 28A-28B using a corresponding steering vector.

Meanwhile, a wireless communication system 31 illustrated in FIG. 1C is a multiple input, multiple output (MIMO) system in which each of a station or transmitter 32 and a station or receiver 34 is equipped with multiple antennas (antennas 36A-36B defining an antenna array 37, and antennas 38A-38B defining an antenna array 39). Each of the transmitter 32 and the receiver 34 can apply steering vectors to the respective antenna array 36 or 38 to define gain patterns 40.

In the systems of FIGS. 1A, 1B, and 1C, a steering matrix can also be utilized whereby multiple streams are beamformed.

Figure 2:
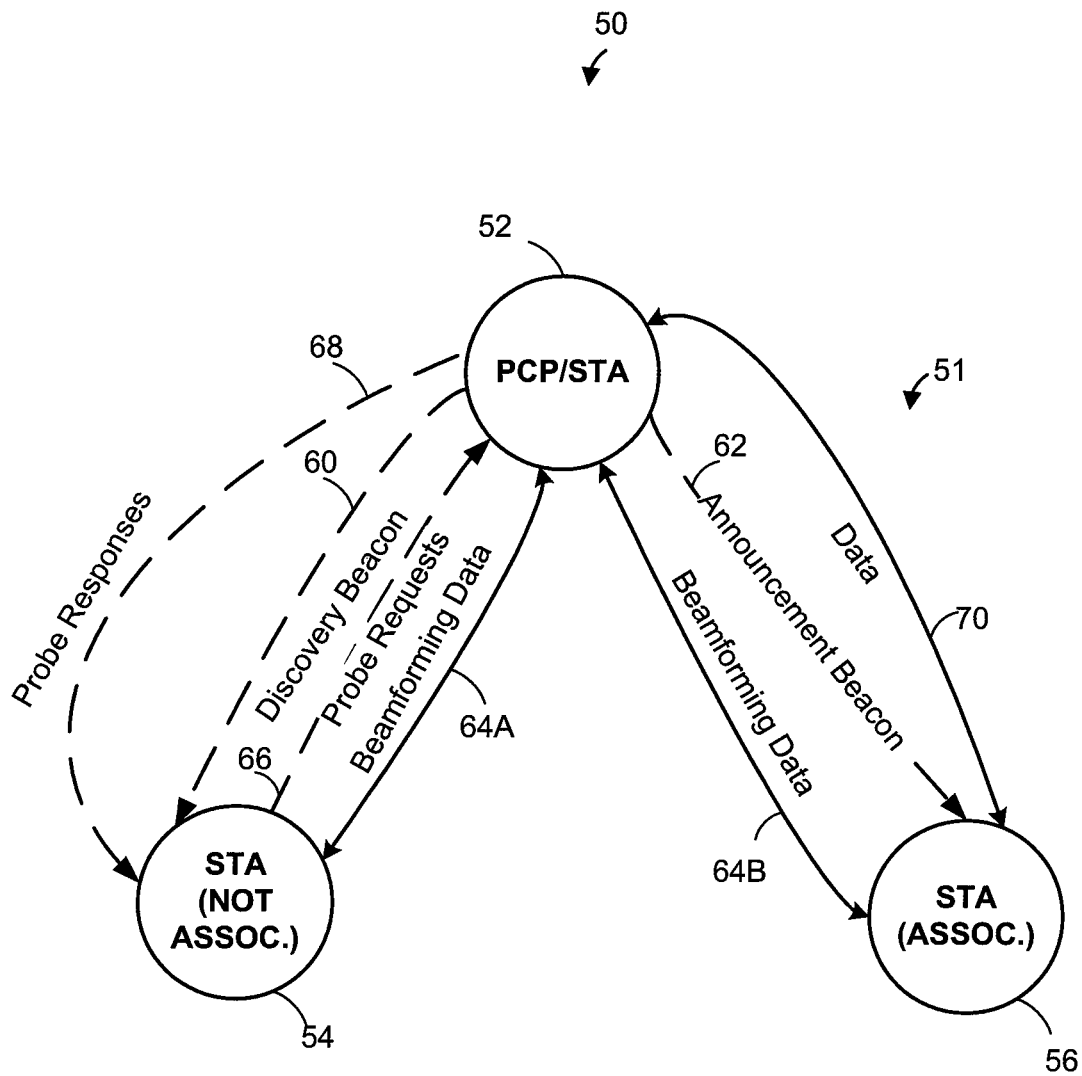
FIG. 2 is a block diagram of an example network in which a piconet central point (PCP) exchanges beamforming data and other information with a device not yet associated with the network and a device already associated with the network.

Referring to FIG. 2, an example communication system 50 includes a piconet 51. The piconet 51 includes a device 52 that acts as a piconet central point (PCP). A device 54 is not yet associated with the piconet 51, whereas a station 56 is already associated or beamformed with the piconet 51. The PCP 52 communicates with various devices such as a station 54 and the station 56. The PCP 52 can transmit one or multiple beacons 60 to notify unassociated devices such as the station 54 of the existence of the communication system 50, and to specify parameters that devices wishing to join the communication system 50 may require. Beacons such as the beacon 60 (i.e., beacons intended for unassociated devices) may be referred to as discovery beacons. When the station 54 detects a discovery beacon such as the beacon 60, the station 54 can utilize information in the discovery beacon 60 to attempt to establish a connection with the PCP 52 and become associated with the piconet 51. In general, discovery beacons can serve several functions. For example, discovery beacons permit unassociated devices to identify the presence of a piconet and learn information about the piconet such as the received signal strength of signals from the PCP, an identifier of the piconet (e.g., a piconet ID), information about communication methods used in the piconet such as supported transmission rates, modulation methods, etc., a timestamp so that a device can synchronize its local clock with the clock of the PCP.

The PCP 52 can also transmit beacons 62 that provide scheduling information and other network management data to the already associated devices such as the station 56. Beacons such as the beacon 62 (i.e., beacons intended for already associated devices) may be referred to as announcement beacons. In general, announcement beacons provide management information that can be used by already associated devices. Announcement beacons can include an indication of when the next allotment time (AT) timeslot will start so that a device can know when the device should wake up (to receive the next announcement beacon or another management frame) if the device wishes to go into a power save mode until the next AT timeslot. Announcement beacons can also include data such as capability information that indicates requirements of stations that wish to be associated with the piconet, the structure of a superframe (e.g., when certain timeslots begin in the superframe), etc. In one implementation, the PCP 52 coordinates communication in the network 50. For example, the PCP 52 establishes superframes, each having timeslots during which different types of protocol functions are performed. As used herein, timeslots are not limited to any particular duration, and different timeslots can correspond to time periods of different lengths. In other words, different timeslots within a superframe may have different durations, and a particular type of timeslot may have different durations in different superframes. The beginning of each superframe can coincide with the PCP 52 transmitting a discovery beacon 60. It will be understood, however, that some superframes may omit the transmission of a discovery beacon. For example, the start of some superframes may coincide with the beginning of an AT timeslot. In some but not all of these cases, the PCP 52 transmits an announcement beacon 62 at the beginning of the AT timeslot. The interval of time between adjacent (in time) discovery beacons may be referred to as a beacon interval. Additionally, a timeslot, the beginning of which coincides with the beginning of a superframe, may be for a protocol function other than a beacon. These implementations, and some of the respective potential advantages of such implementations, are discussed in more detail below.

Further, the PCP 52 and the stations 54 and 56 can exchange beamforming data in messages in the form of beamforming training (BFT) frames 64A and 64B, respectively, to develop corresponding transmit and receive beamforming vectors or matrices. For example, the process of connecting to the PCP 52 in response to detecting a discovery beacon 60 can include beamforming training. As discussed in more detail below, the BFT frames 64A transmitted to and from unassociated devices may be formatted differently than the BFT frames 64B transmitted to and from associated devices. Still further, the unassociated station 54 can transmit probe requests 66 to request additional network management and configuration data from the PCP 52, and the PCP 52 may accordingly respond with probe responses 68 that provide the requested data.

To exchange useful data, the associated station 54 and the PCP 52 exchange data messages or frames 70. Of course, the communication system 50 can also support other types of frames such as authentication frames, dissociation frames, reassociation frames, etc. (not illustrated in FIG. 2 for simplicity). Also, the device 54 in other implementations can be an access point, a base station, etc. Further, the device 54 can communicate frames 70 and/or BFT data with other devices (not shown) that are part of the piconet 51.

Figure 3A:
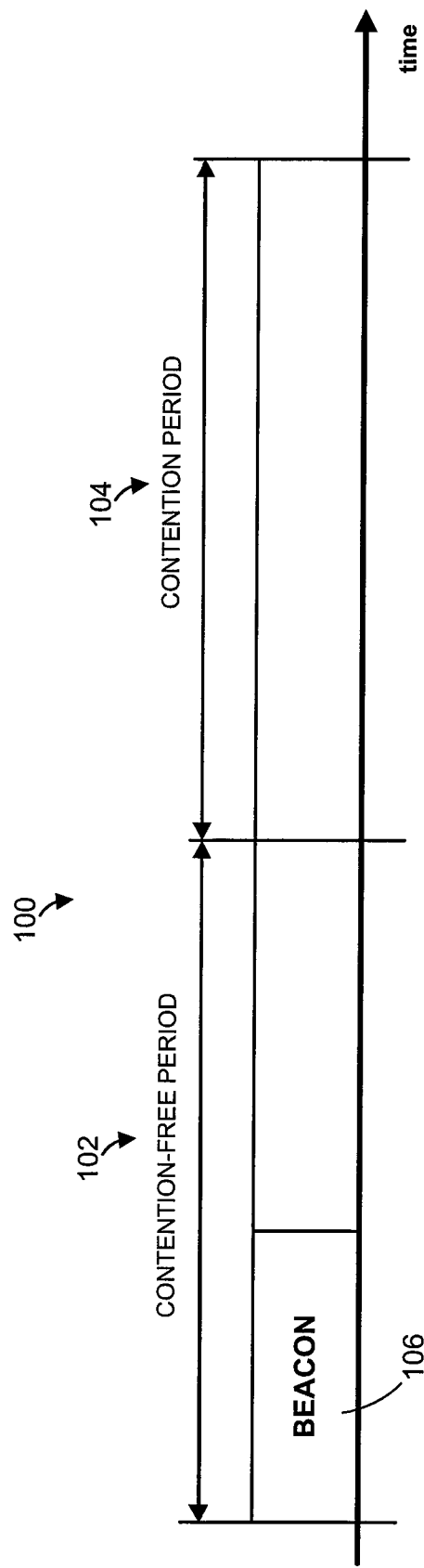
FIG. 3A is a block diagram of an example superframe according to a communication protocol.

FIG. 3A is a diagram of an example beacon interval 100 including a contention-free period 102 and a contention period 104. The beacon interval 100 may be established by the PCP 52. Generally speaking, the contention-free period 102 includes one or several timeslots scheduled for a particular purpose. Referring back to FIG. 2, for example, the PCP 52 can allocate one timeslot in the contention-free period 102 for transmitting one or several discovery beacons 60, another timeslot for transmitting one or several announcement beacons 62, etc. By contrast, the contention period 104 includes one or several periods as time resources that communicating devices can dynamically acquire in real time (as opposed to asking the PCP 52 to allocated time to the device and waiting to be informed by the PCP 52 of an allocated time period, for example). A network device such as the PCP 52 illustrated FIG. 2 can announce the schedule of the periods 102 and 104 in a beacon frame transmitted during a beacon timeslot 106, for example. The period 102 and the period 104 need not be contiguous. For example, portions of the contention-free period 102 may be interspersed with portions of the contention period 104.

Figure 3B:
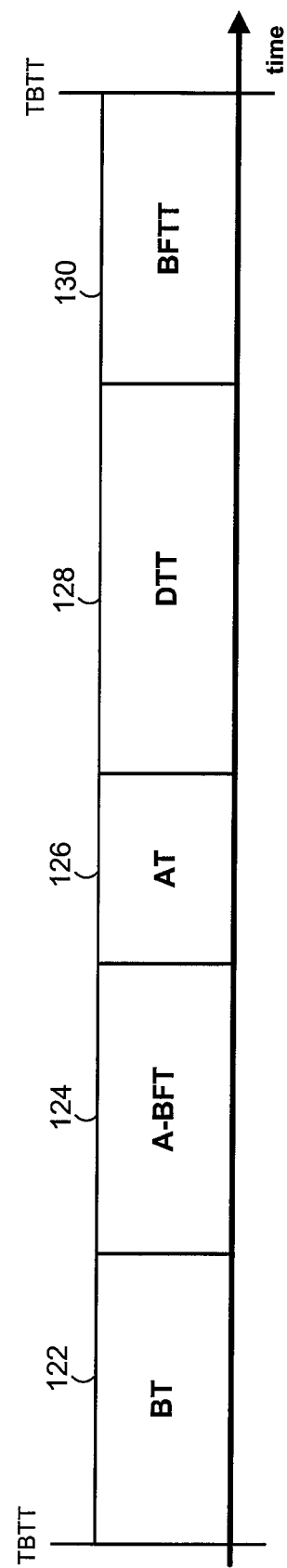
FIG. 3B is a block diagram of an example superframe in which beacon functions are divided into several time periods.

As a more specific example of superframe scheduling, FIG. 3B illustrates an example superframe 120 including several timeslots serving different purposes. Timing of the superframe 120 can be established by a PCP 52, for example, and can be measured relative to a target beacon transmission time (TBTT). The TBTT may coincide with the start of the superframe 120. The TBTT may be announced by a PCP during a previous frame so that devices in the piconet know when the superframe 120 will begin. The superframe 120 includes a beacon time (BT) timeslot 122, an association beamforming training (A-BFT) timeslot 124, an allotment time (AT) timeslot 126, a data transmit time (DTT) timeslot 128 and a beamforming training time (BFTT) timeslot 130. It will be noted that the timeslots within the superframe 120 are not drawn to scale, and that the duration of each of the timeslots 122-130 can be configurable and/or implementation-dependent. Further, although the superframe 120 is illustrated in FIG. 3B with specific types of timeslots in a specific order, one or more additional types of timeslots may be included, one or more illustrated timeslots may be omitted, and the order of timeslots may be different during a given beacon interval.

In one implementation, the BT timeslot 122 is used by a PCP to transmit discovery beacons such as discovery beacons 60 discussed with reference to FIG. 2. In addition to alerting stations proximate to the PCP of the presence of the PCP, data transmitted during the BT timeslot 122 can be used for beamforming. Typically, a PCP applies a different beamforming matrix to the antenna set of the PCP as each discovery beacon is transmitted during the BT timeslot 122. An unassociated device can then measure the quality of each received beacon (e.g., a signal to noise ratio (SNR), a bit error rate (BER), etc.) and feed back the measurements to the PCP so that the PCP can determine a transmit beamforming matrix that provides the best quality. Because the information transmitted during the BT timeslot 122 is primarily for use by unassociated devices, the PCP transmits data during this interval typically at a low data rate.

In the example format of FIG. 3B, the A-BFT timeslot 124 is allocated primarily so that new stations that are not yet beamformed can perform beamforming training with the PCP. Also, the unassociated station can perform transmit beamforming training and/or the PCP can develop transmit and/or receive beamforming matrices with respect to the unassociated station. Similar to the BT timeslot 122, the A-BFT timeslot 124 typically does not include information or communication opportunities that associated and beamformed stations can or need to use. Accordingly, associated stations can "sleep" (i.e., go into a low power mode) during the timeslots 122 and 124, i.e., the associated stations can conserve energy by not listening to wireless communications at least during the timeslots 122 and 124.

The AT timeslot 126 can be used by a PCP to announce timeslot allocation and scheduling information, for example, to stations already associated with the network. For example, the PCP can indicate the types and the corresponding start times of timeslots in the DTT interval 128. In general, the PCP can exchange management frames with one or several stations in the AT timeslot 126 related to scheduling of service periods, contention-based periods, BFT periods, etc., channel measurement, association information, and other data.

With continued reference to FIG. 3B, the DTT timeslot 128 may be used to transmit data between the PCP and a communicating station, or between two or more communication stations. As discussed above, the DTT sometimes may be divided into multiple timeslots, and the PCP can announce the scheduling and assignment of these timeslots (e.g., reserved for a station with identity N) during the AT timeslot 126. Further, the BFTT timeslot 130 may be used to perform beamforming training between the PCP and one or several associated stations, or between several associated stations that discover each other via a series of request and response frames.

In contrast to the timeslots 122 and 124, frames in each of the timeslots 126-130 can in general be transmitted at a high data rate or even at the highest rate supported by the associated devices (depending on channel conditions, for example). If the length of the BT timeslot 122 and/or the A-BFT timeslot 124 can be reduced, more time can be allocated to other timeslots in the superframe 120 for transmission of useful data. One way to reduce the length of the BT timeslot 122 is to limit the amount of information in discovery beacons 60 transmitted during the BT timeslot 122. As discussed above, associated devices do not need to listen to the timeslots 122 and 124. However, a PCP need not schedule each superframe in the same manner. In particular, the duration and even the presence of at least some of the timeslots 122-130, as well as the respective ordering of these timeslots, may be adjusted each superframe according to network conditions or other factors. Thus, it may be difficult for associated stations to determine when the timeslots 122 and 124 occur without actually listening to the timeslots, and thus it may be difficult for associated stations to determine when the associated stations should wake up. Examples of how timeslots in a superframe can have different start times, durations, or even be omitted are briefly discussed next with reference to FIGS. 4A-4C.

Referring generally to FIGS. 2, 3A, and 3B, the term "beamformed" as used herein refers to stations that have beamformed at least once. When transmitting announcement beacons at a high data rate, the PCP 52 assumes that stations associated with the network have beamformed and accordingly can properly receive and process the announcement beacons. Because wireless channels are highly directional at certain high frequencies, stations such as the stations 54 and 45 generally must have completed beamforming to be able to receive network communications in timeslots other than the BT timeslot 122 and the A-BFT timeslot 124. Conversely, the PCP 52 assumes that stations listening discovery beacons and participating in beamforming training during the A-BFT timeslot 124 have not yet beamformed.

Referring to FIG. 4A, a superframe 150 may be structurally similar to the superframe 120 illustrated in FIG. 3B. More specifically, the superframe 150 may include a BT timeslot coinciding with the beginning of the superframe 150, an A-BFT timeslot scheduled following the BT timeslot, an AT timeslot scheduled following the A-BFT timeslot, a DTT timeslot, and a BFTT timeslot at the end of the superframe 150. In accordance with the example superframe 150, the PCP begins to communicate information relevant to the associated stations at the beginning of the AT timeslot.

On the other hand, a superframe 155 illustrated in FIG. 4B corresponds to an unsuccessful attempt to perform A-BFT (as a result of a collision, for example), and the PCP accordingly begins transmissions corresponding to the AT timeslot earlier than originally scheduled. In other words, the PCP dynamically adjusts the scheduling of the A-BFT and AT timeslots in response to network conditions. In another situation illustrated in FIG. 4C, the PCP does not schedule BT or A-BFT timeslots in a superframe 160. In yet another situation (not illustrated), the PCP schedules a BT timeslot but does not schedule an A-BFT timeslot. It will be noted that the superframe 160 may immediately follow the superframe 155 or the superframe 150, and thus a station cannot predict with certainty the timing of a superframe based on one or several preceding superframes. As a result, an associated station cannot sleep through one or both timeslots BT and A-BFT without the risk of missing the beginning of the AT timeslot. Moreover, the uncertainty of presence and timing of the BT, A-BFT, and AT timeslots complicates DTT scheduling.

Next, several example efficient formats of the announcement beacon 62, the discovery beacon 60, the BFT frames 64A and 64B, as well as superframes that include some or all of these frames, are discussed with reference to FIGS. 5A-7D. More specifically, announcement beacons are discussed with reference to FIGS. 5A-5E, discovery beacons are discussed with reference to FIGS. 6A-6C, and BFT frames are discussed with reference to FIGS. 7A-7D.

Announcement Beacons

Figure 5A:
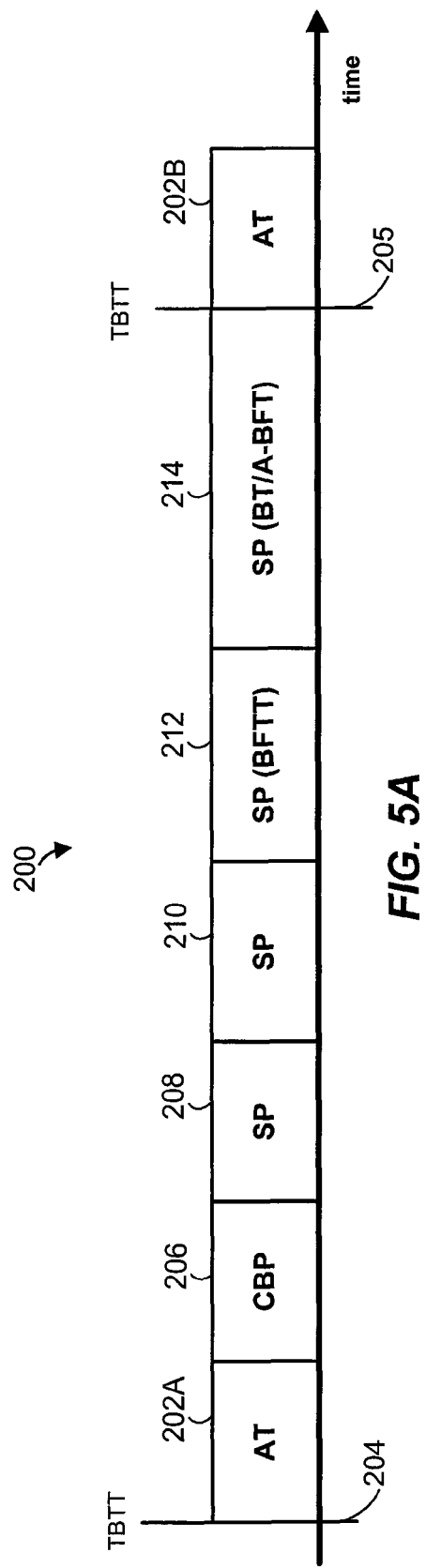
FIG. 5A is a block diagram of an example superframe in which the beginning of an AT timeslot defines the beginning of the superframe.

FIG. 5A is a diagram of an example superframe 200 that provides a greater degree of certainty to the associated stations in identifying the beginning of the AT timeslot, and generally provides a more convenient scheduling technique than the example superframes of FIGS. 4A-4C. In particular, the superframe 200 includes an AT timeslot 202A scheduled at the beginning of the superframe 200 (in other words, the beginning of the AT timeslot 202A coincides with the TBTT 204, the beginning of the next AT timeslot 202B coincides with the TBTT 205, etc.). In contrast to a BT timeslot which may be scheduled in some superframes and omitted in other superframes, an AT timeslot such as the timeslot 202A or 202B provides a reliable and consistent timing reference in superframe communications.

An announcement beacon can be transmitted during the AT timeslot 202A. In some embodiments, the announcement beacon may include a timestamp and a superframe length indication (e.g., the interval between the TBTT 204 and the TBTT 205) to allow associated stations to properly synchronize with the network and calculate the timing of the next TBTT. The associated stations can wake up before the beginning of each AT timeslot, wait for an announcement beacon, and process the network management information included in the announcement beacon.

With continued reference to FIG. 5A, the superframe 200 includes a contention-based protocol (CBP) timeslot 206 and several service periods (SPs) 208-214. In general, a service period can be allocated for any desired function. It will be noted that in the example superframe format of FIG. 5A, beamforming training for the associated stations (typically conducted during a BFTT timeslot) is a special case of an SP. Thus, a PCP can schedule the SP 212 to begin anywhere within the superframe 200, and the PCP can also use information elements used for SP identification to specify the use and timing of the SP 212. Similarly, BT and A-BFT functionality can be associated with an SP 214. BT and A-BFT timeslots in this example are also, in a sense, special cases of an SP timeslot (see FIG. 3B, for example).

With respect to the SP 212, this timeslot can be allocated to a pair of devices (e.g., two associated stations or the PCP and an associated station) to perform beamforming training. To estimate the length of the SP 212, a station or the PCP can assess capability parameters such as the number of antennas at the source device and the destination device. If the pair of devices complete beamforming training before the scheduled end of the SP 212, the pair of devices can use the remaining time to exchange data using data frames, for example. Alternatively, the SP 212 can be dynamically truncated for dynamic resource allocation. If, on the other hand, beamforming training cannot be completed within the SP 212, the source device or the target device can request another SP to continue beamforming training.

The SP 214 can be used as a service period allocated to the PCP to transmit discovery beacons and conduct beamforming training with new stations, i.e., stations that have joined the network but have not yet beamformed. In some embodiments, the PCP transmits discovery beacons at the beginning of the SP 214. If communications related to A-BFT functionality complete before the end of the SP 214, the PCP and the corresponding one or several stations can use the remaining time for data transmissions, or the PCP can use the remaining time for dynamic resource allocation.

Although FIG. 5A depicts the timeslots 212 and 214 at the end of the superframe 200, it is possible to schedule these timeslots elsewhere within the superframe 200. Of course, the timeslot 212 need not precede the timeslot 214, and the order of these timeslots illustrated in FIG. 5A can be reversed.

Figure 5B:
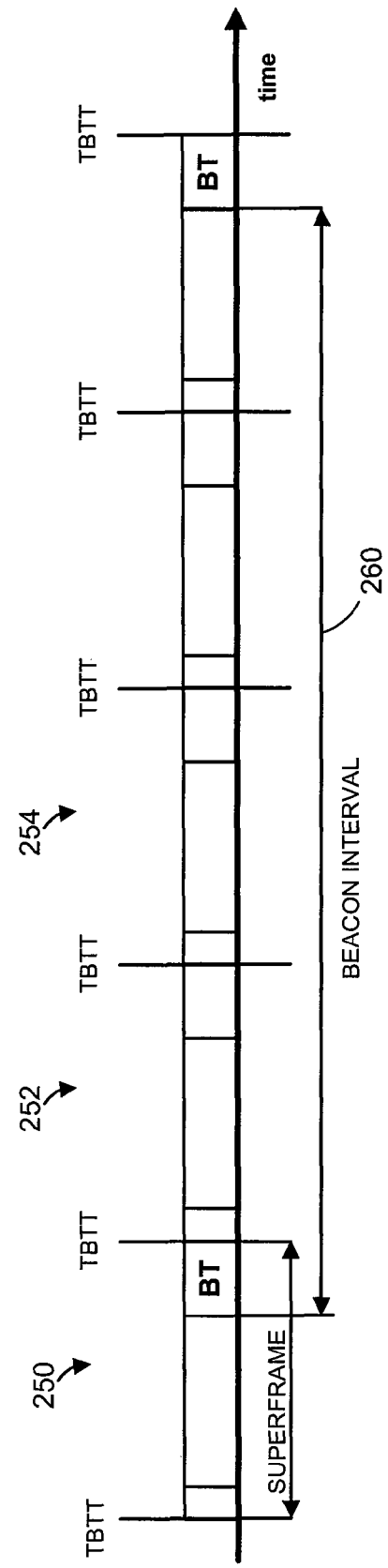
FIG. 5B is a block diagram of an example beacon interval that spans several superframes.

Referring to FIG. 5B, a beacon interval (i.e., the time between two consecutive discovery beacons) need not directly correspond to a superframe length. For example, a superframe 250 may include a BT timeslot while superframes 252, 254, etc. immediately following the superframe 250 may omit the BT timeslot. A beacon interval 260 accordingly can span one or more superframe lengths. Example techniques for signaling the length of the beacon interval are discussed below with reference to FIG. 6B. For instance, the beacon interval can be transmitted in a discovery beacon in the BT timeslot.

Figure 5C:
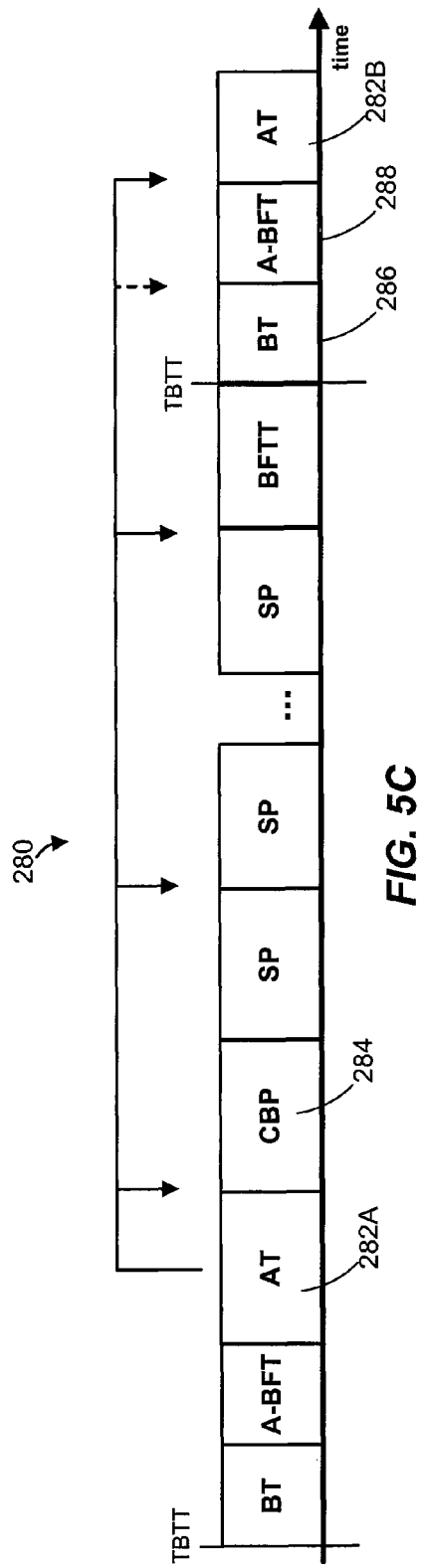
FIG. 5C is a block diagram of an example beacon interval in which an announcement beacon in an AT timeslot specifies the beginning time(s) of one or several timeslots such as one or several service periods (SPs)

FIG. 5C is a diagram of another example superframe 280 in which an AT timeslot 282a does not coincide with the TBTT. An announcement beacon transmitted in the AT timeslot 282A can specify the beginning of the next AT timeslot 282B, the presence and the beginning of a CBP period 284, one or several SPs allocated for beamforming training, etc. For clarity, FIG. 5C schematically illustrates this information using arrows that extend from the AT timeslot 282A. The announcement beacon accordingly can include one or several information elements, e.g., CBP allocation IE, SP/BFT allocation IE, etc., that provide scheduling information for timeslots that follow the AT timeslot 282A. The arrow drawn in a broken line indicates that an IE (or another type of a data unit) in the announcement beacon can specify the ending time of a BT timeslot 286 if an A-BFT timeslot 288 is omitted and the AT timeslot 282B immediately follows the BT timeslot 286. Conversely, if both the BT timeslot 286 and the A-BFT timeslot 288 are present, an IE in the AT timeslot 282A specifies the ending time of the A-BFT timeslot 288. Further, the announcement beacon can include a timestamp and specify the beacon interval. The beacon interval can be specified, for example, by indicating the length of the beacon interval or a time at which the next beacon will be transmitted.

As discussed above with reference to FIG. 4, the timing of the next AT timeslot can be dynamic. Thus, to specify the beginning of the next AT timeslot 282B, a PCP can apply the general formula:

Next AT starting time=Next TBTT+BT duration+A-BFT duration    (Eq. 1)

In general, the beginning of the next AT timeslot 282 can be specified in a dedicated information element to be used in discovery beacons and/or announcement beacons.

According to one example approach, the PCP can calculate next BT duration based on the next discovery beacon size and the sweep number, and specify the calculated ending time of the BT timeslot. The associated stations can then sleep through at least the BT timeslot, but have to be awake for the entire or partial duration of the A-BFT timeslot. If a BT timeslot is not being scheduled in the superframe that will follow the superframe 280, the end of the BT timeslot coincides with beginning of the BT timeslot which, in turn, coincides with the next TBTT.

According to another example approach, a PCP can announce the starting time of the AT timeslot in the superframe that will follow the superframe 280. The PCP can allocate a fixed-sized A-BFT timeslot when both BT and A-BFT timeslots are included in the superframe. The PCP can also estimate the duration of A-BFT using any suitable technique. In some implementations, the A-BFT timeslot has a minimum duration that corresponds to A-BFT idle detection period, and the PCP can specify at least a partial duration of A-BFT during which associated stations can continue to sleep. In this implementation, stations in an active mode (i.e., associated with the network and beamformed) have to wake up before the announced AT starting time. If the PCP ends the A-BFT-specific communications earlier, the PCP can communicate with the active stations during the remainder of the A-BFT timeslot. Conversely, if the A-BFT timeslot is not sufficiently long, the PCP can extend A-BFT communications into the AT timeslot, or continue these communications in another SP such as a BFT-specific SP (see FIG. 5A, for example).

Figure 5D:
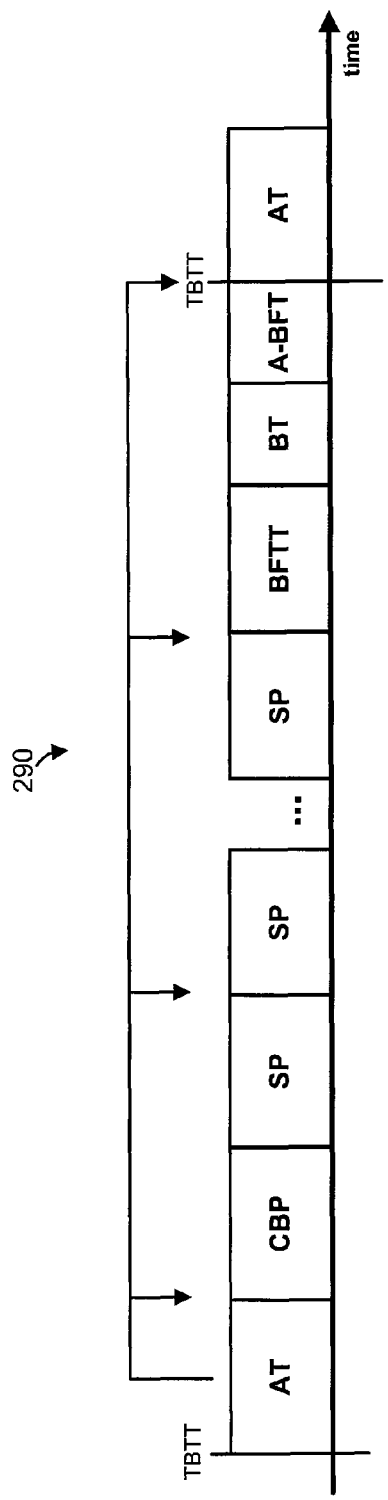
FIG. 5D is a block diagram of an example beacon interval in which an announcement beacon in an AT timeslot specifies the beginning time(s) of one or several timeslots such as one or several service periods (SPs), and in which the announcement beacon defines the beginning of the superframe.

FIG. 5D is a block diagram of a superframe 290 in which an AT timeslot coincides with the TBTT. Otherwise, the structure of the superframe 290 is generally similar to that of the superframe 280 of FIG. 5C. Generally speaking, a PCP can apply the techniques discussed above to schedule timeslots and format announcement beacons irrespective of where superframe boundaries (i.e., TBTTs) occur.

Figure 5E:
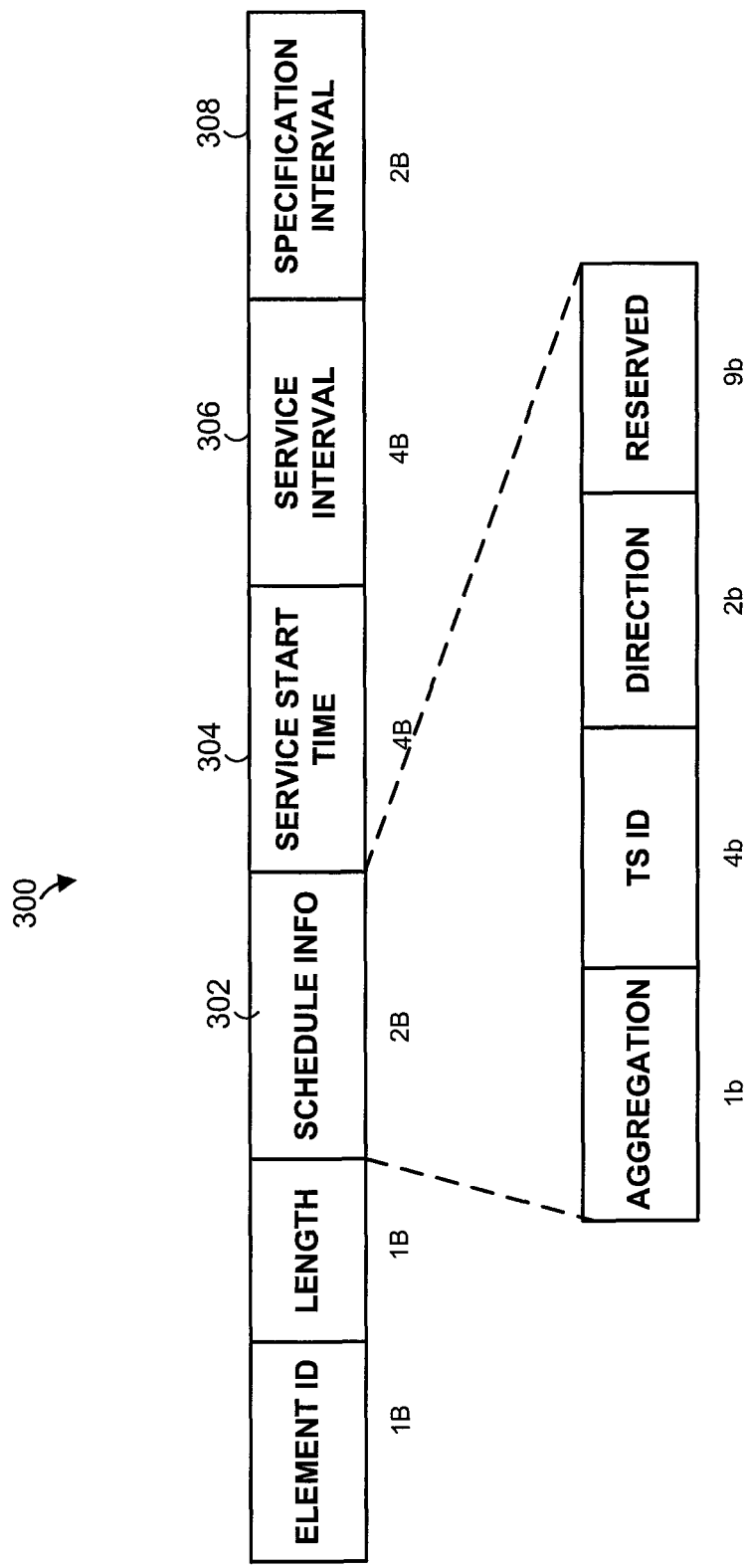
FIG. 5E is a block diagram of an example information element that can be used in an announcement beacon.

FIG. 5E is a diagram of an example SP/BFT allocation information element (IE) 300. The IE 300 includes a scheduling information field 302, a service start time field 304, which can include the lower four bytes of an anticipated time synchronization function (TSF) time, a service interval field 306, which can specify time in µs, and a specification interval field 308, which can specify time in time units (TUs) (each equal to 1024 µs). FIG. 5E additionally specifies example lengths of each of the fields of the IE 300, and of the sub-fields of the schedule information field 302, where "b" stands for bits and "B" stands for bytes.

Discovery Beacons

Generally speaking, it is possible to format discovery beacons as management frames or as BFT frames. In other words, if a discovery beacon is formatted as a BFT frame, the discovery beacon provides training information that can be used for beamforming. It is also possible to utilize a discovery beacon in an initial beamforming Tx training sweep using the same MPDU in each transmission. The discovery beacon in these implementations can be relatively short, and can be used primarily to guide unassociated stations into the A-BFT timeslot. Following the A-BFT timeslot, the unassociated stations can use the probe request/response mechanism (see FIG. 2) to obtain additional information about the network, such as detailed piconet basic service set (PBSS) capability data, for example.

Figure 6A:
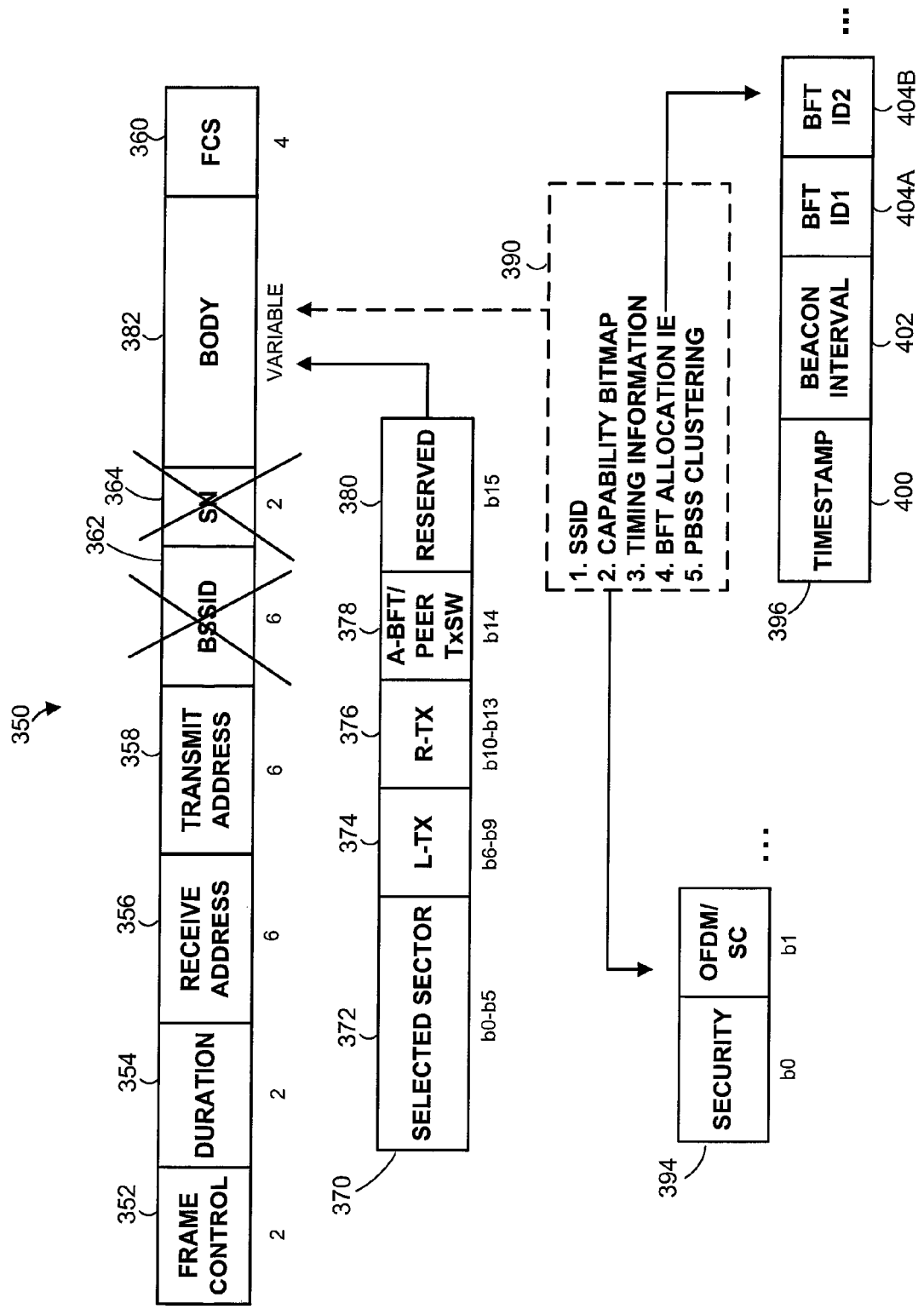
FIG. 6A is a block diagram of an example discovery beacon.

Referring to FIG. 6A, an example discovery beacon 350 includes a relatively small set of parameters to decrease the duration of a BT timeslot. More specifically, the discovery beacon 350 can include information common to all frames such as a frame control field 352, a duration field 354, a receive address field 356, a transmit address field 358, and a frame check sequence (FCS) field 360. In other implementations, however, some of the fields 352-360 may be omitted. Although the discovery beacon 350 is illustrated having a six-byte basic service set identifier (BSSID) field 362 and a two-byte sequence number (SN) field 364, these fields can be omitted (signified by these fields being crossed out).

The discovery beacon 350 can also include sector sweeping information 370 with a selector sector field 372, an L-TX field 374 to specify a number of the beamforming training sequences for Tx sector sweeping, an L-RX field 376 to specify a number of the beamforming training sequences for Rx sector sweeping, a peer Tx flag field 378 to indicate whether peer Tx training is expected, and a reserved field 380. The sector sweeping information 370 may be included in a body field 382 of the discovery beacon 350, for example.

With continued reference to FIG. 6A, the body 382 of the discovery beacon 360 may also include some or all (or none) of the fields listed in block 390. In particular, the discovery beacon 350 may be transmitted with a service set identifier (SSID), a capability bitmap, timing information, a BFT allocation IE, and PBSS clustering data. By way of example, FIG. 6A partially illustrates an example capability bitmask 394. In at least some implementations, the capability bitmask 394 includes only essential information such as a security setting (i.e., whether the network is a secure network), SC/OFDM settings, etc. To retrieve complete capability data, devices wishing to join the network can transmit probe requests to the PCP (see FIG. 2). Further with respect to the block 390, the timing information can include some or all (or none) of a timestamp, a superframe length, and timing information for the next discovery beacon (expressed as an interval measured in superframes and an offset within a superframe, for example).

FIG. 6A further illustrates an example format of a BFT allocation IE 396 having a timestamp field 400, a beacon interval 402, and several BFT timeslot description fields such as the fields 404A and 404B. Generally speaking, associated stations sometimes lose a beamformed link with a PCP, and accordingly may require a BFT timeslot to conduct a new beamforming training session. Because these stations can no longer rely on announcement beacons, the PCP can use one or several discovery beacons to transmit a BFT schedule. To support this functionality, the BFT allocation IE 396 can include the timestamp field 400 that can be used for time synchronization with the PCP, and the beacon interval 402 can be used to calculate the next BT time. Each of the BFT timeslot description fields 404A and 404B can specify an identity of a station (which may be expressed as a one-byte value), a BFT slot starting time (which maybe a two-byte value specifying the offset from the current TBTT), and the duration of the BFT timeslot (which may be expressed as a two-byte value). In some implementations, several BFT timeslots can form a continuous time interval, and at least some of the BFT timeslot description fields 404A and 404B need not specify the duration of the corresponding BFT timeslot.

In some implementations, a PCP can transmit either a short version of a discovery beacon (hereinafter, a "short discovery beacon") or a long version of a discovery beacon (hereinafter, a "long discovery beacon"), each generally consistent with the format illustrated in FIG. 6A. The short discovery beacon includes only sector training information such as the sector sweeping information 370, for example. In other words, the short discovery beacon can omit some or all of the block 390. The short discovery beacons can effectively guide unassociated stations into the A-BFT timeslot. Following beamforming in the A-BFT timeslot, these stations can exchange probe requests and responses with the PCP to obtain detailed PBSS information. The process of transmitting probe requests and listening to probe responses by unassociated stations to obtain detailed information such as SSID and PBSS information can be referred to as "active scanning." Moreover, if a station already has a profile (BSSID) of the PBSS, the station can quickly re-join the PBSS following only the short discovery beacons.

On the other hand, the long discovery beacons can carry sector training information (similar to identical to the sector training information of the short discovery beacons), SSID, and a simplified PCP/PBSS capability bitmap such as the capability bitmask 394, for example. In other words, long discovery beacons can include the sector sweeping information 370 and some or all of the block 390. Long discovery beacons are nevertheless shorter than beacons used by stations today at least because long discovery beacons omit at least the BSSID field 362 and the SN field 364. Further, long discovery beacons can include a short capability bitmap rather than the capability IE included used stations today, and stations can receive detailed capability information using probe requests. Unassociated stations need not perform active scanning when listening to long discovery beacons. Instead, these stations can conduct only passive scanning to detect a long discovery beacon, retrieve SSID and basic PCP/PBSS capability information and, if desired, continue to request detailed PCP/PBSS information via probe requests.

To reduce overhead, a PCP can transmit long discovery beacons less frequently than short discovery beacons. In some embodiments, the PCP transmits long discovery beacons only on demand.

Figure 6B:
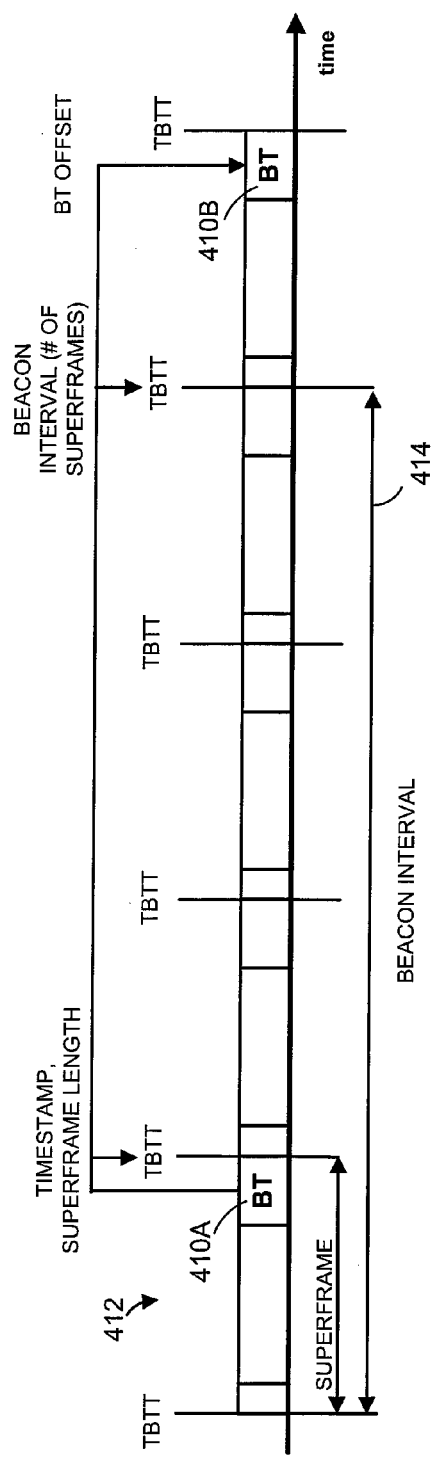
FIG. 6B is a block diagram of an example multi-superframe beacon interval in which a discovery beacon specifies one or several of superframe length, beacon interval, and BT offset.

As illustrated in FIG. 6B, a discovery beacon transmitted during the BT timeslot 410A of a superframe 412 can include a timestamp and superframe length information so that unassociated and/or unbeamformed stations can determine the next TBTT. The discovery beacon can also specify the beacon interval 414 which may be measured in numbers of superframes, for example. Using this information, unassociated and/or unbeamformed stations can determine the timing of the next discovery beacon (i.e., the beginning of the next BT timeslot 410B). Further, the discovery beacon can specify the offset value of the next BT timeslot 410B so that the unassociated and/or unbeamformed stations can accurately and reliably locate the next discovery beacon, if needed.

Figure 6C:
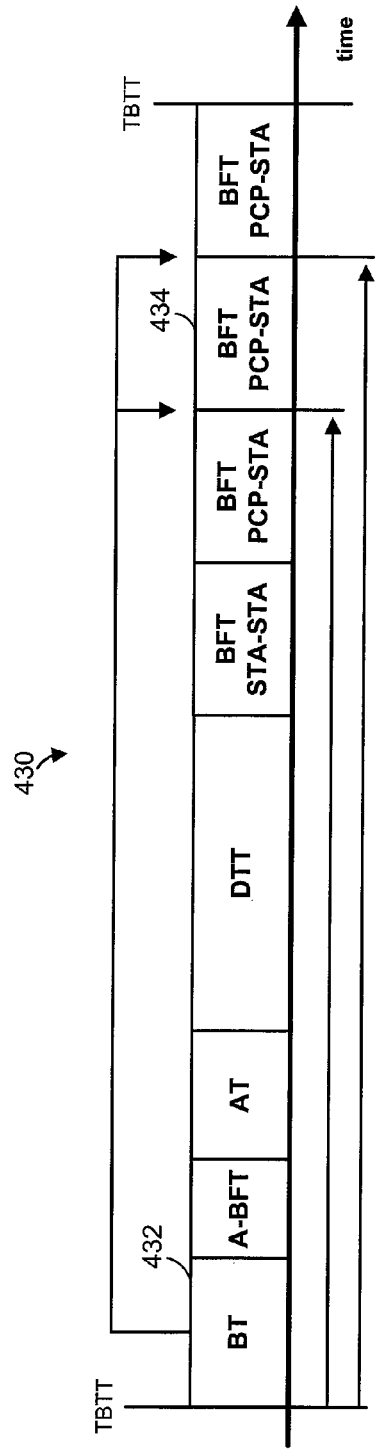
FIG. 6C is a block diagram of an example superframe in which a discovery beacon specifies the timing of several subsequent timeslots.

Referring to FIG. 6C, an example superframe 430 may include a BT timeslot 432 during which a PCP can transmit one or several discovery beacons. Using one or several information elements such as the BFT allocation IE 396 discussed with reference to FIG. 6A, a discovery beacon can identify a BFT timeslot 434, for example.

In this example, the discovery beacon identifies the start and the end of the BFT timeslot 434 as respective measurements relative to the TBTT of the superframe 430.

In some implementations, the beacon interval information that may occupy two bytes in the body of a discovery beacon can be omitted. If needed, unassociated stations can request beacon interval using probe request and probe response frames, for example. Table 1 summarizes some of the techniques for reducing the amount of data transmitted in the body of a discovery beacon (e.g., in the body 382 of the discovery beacon 350 illustrated in FIG. 6A). In Table 1, the symbol "→" indicates that the corresponding information element or other data unit can be omitted from the discovery beacon and transmitted in an announcement beacon instead. The symbol "X" indicates that the corresponding information element or other data unit can omitted from both the discovery beacon and the announcement beacon. In general, it is possible to omit some or all of the entries labeled with the symbols "→" or "X" from the discovery beacon according to the desired implementation.

TABLE 1

| Action | Information | Notes | Length |
|---|---|---|---|
| → | Timestamp | | 8 bytes |
| → | Beacon Interval | | 2 bytes |
| | Capability Info | | 2 bytes |
| | SSID | | 2-34 bytes |
| | Supported Rates | | 3-10 bytes |

TABLE 1-continued

| Action | Information | Notes | Length |
|---|---|---|---|
| X | FH parameter set | The frequency hopping (FH) parameter set IE can be used by stations that generate discovery beacons using frequency-hopping PHY. | 7 bytes |
| X | DS Parameter Set | The direct sequence (DS) parameter set IE can be used by stations that generate discovery beacons using direct sequence PHY. | 3 bytes |
| → | CF Parameter Set | The CF parameter set IE is only present in discovery beacons generated by access points supporting PCF. | 8 bytes |
| X | IBSS parameter set | The IBSS parameter set IE is only used by stations that generate discovery beacons in an IBSS. | 4 bytes |
| → | TIM | The TIM information element is only present in discovery beacons generated by access points. | 6-256 bytes |

Beamforming Training (BFT) Frames

Generally speaking, BFT frames can be transmitted during several stages of beamforming training. A listing of elements necessary for each of two example stages of beamforming (A and B) of associated and unassociated devices is provided in Table 2. More specifically, Table 2 identifies several information elements, along with the respective lengths, in one implementation, in BFT frames exchanged with associated devices during stages A and B during one or several BFTT timeslots, and in BFT frames exchanged with unbeamformed devices during BT and A-BFT timeslots, respectively. The BT and A-BFT timeslots can be similarly designated as respective stages A and B of beamforming previously unbeamformed stations.

TABLE 2

| Information Element | Size | Stage A (BFTT) | Stage B (BFTT) | Stage A (BT) | Stage B (A-BFT) |
|---|---|---|---|---|---|
| Down Counter (CDOWN) | 6 bits | X | X | X | X |
| L-TX | 4 bits | X | X | X | X |
| L-RX | 4 bits | | X | | X |
| Sector Feedback | 6 bits | | X | | X |
| PCP MAC Address | 6 bytes | | | X | |
| A-BFT Present Flag | 1 bit | | | X | |
| Source Address | 6 bytes | | | | X |
| Destination Address | 6 bytes | | | | X |

Referring to Table 2, a countdown field (CDOWN) field can be included as a subfield in a beacon control field or transmit beamforming sector sweeping (TxSW) IE. CDOWN is a counter indicating the number of beacon frames to the end of a BT timeslot. In one implementation, CDOWN acts as a downcounter, and is zero in the last beacon frame of the BT timeslot. CDOWN can have any suitable range. In one implementation, CDOWN may have a maximum value of 63 and should be zero in the last beacon frame of the BT timeslot.

In general, a BFT frame for use by devices already associated with a network may include a down counter and an L-TX field in a first stage, and a down counter, a sector feedback field, an L-TX field, and an L-RX field in a second stage. Each of the first-stage BFT frame and the second-stage BFT frame may be transmitted during a respective BFTT time interval. On the other hand, a first-stage BFT frame for use by devices that are not yet associated with the network may include a PCP MAC address, a down counter, an L-TX field, and a field to indicate whether A-BFT is present, while a second-stage BFT frame may include a source address, a destination/PBSS address, a down counter, a sector feedback field, an L-TX field, and an L-RX field.

It will be noted that both stage A and stage B BFT frames transmitted in a BFTT timeslot can be transmitted in a PHY header, and therefore do not require the use of a PHY payload. In this manner, the overhead can be further reduced because PHY data units that omit payloads can be utilized.

FIGS. 7A and 7B are diagrams of example BFT data unit 500 that can be used during BFTT timeslots, and a BFT data unit 510 that can be used in a regular control PHY frame. Each of the data units 500 and 510 includes a BTP field 502 to specify whether the data unit has a format consistent with the format of FIG. 7A or FIG. 7B. Further, the frame 500 includes a sector sweep information element 504 that includes data similar to the sector sweeping information 370 discussed with reference to FIG. 6A. It will be noted that the data unit 500 need not include a media access control (MAC) portion, or may include only a portion of a typical MAC portion, such as only a source address of a MAC header.

Figure 7D:
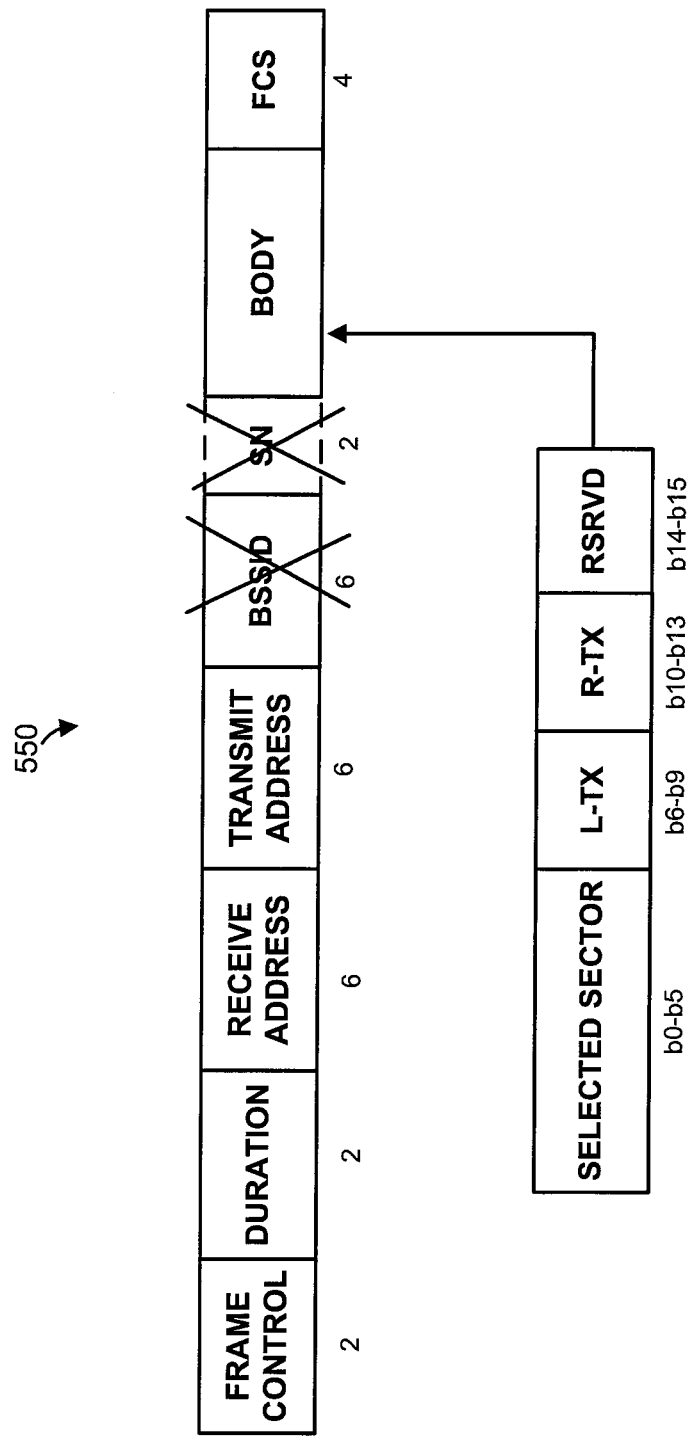
FIG. 7D is a block diagram of an example media access control (MAC) portion of the BFT frame illustrated in FIG. 7B.

On the other hand, the superframe 510 can include sector sweep information in a MAC portion 512. An example format of a sector sweep field 520, which can be included in the field 504 of the data unit 500 or the field 512 of the data unit 512, is illustrated in FIG. 7C. For clarity, FIG. 7D also illustrates an example format of a MAC frame 550 that can be transmitted as the field 512 of the data unit 510 depicted in FIG. 7B. Similar to some of the other examples discussed above, the MAC frame 550 advantageously omits the fields BSSID and SN.

Additional Techniques for Reducing Beacon Overhead

In some implementations, beacon overhead can be further reduced by having stations complete full beamforming sector sweeping over multiple beacon intervals. Thus, a station would scan multiple beacon intervals in order to identify a beacon corresponding to the best sector. In other implementations, the transmit sector resolution can be reduced. In these implementations, a station may first scan for beacons in an omnidirectional receive mode. If the station is unable to receive any beacons, it can then scan in each of its receive beamforming sectors until it detects a beacon. The station may optimize the receive sweeping sequence to attempt to shorten the beacon capture time.

Examples of Architecture

Figure 8A:
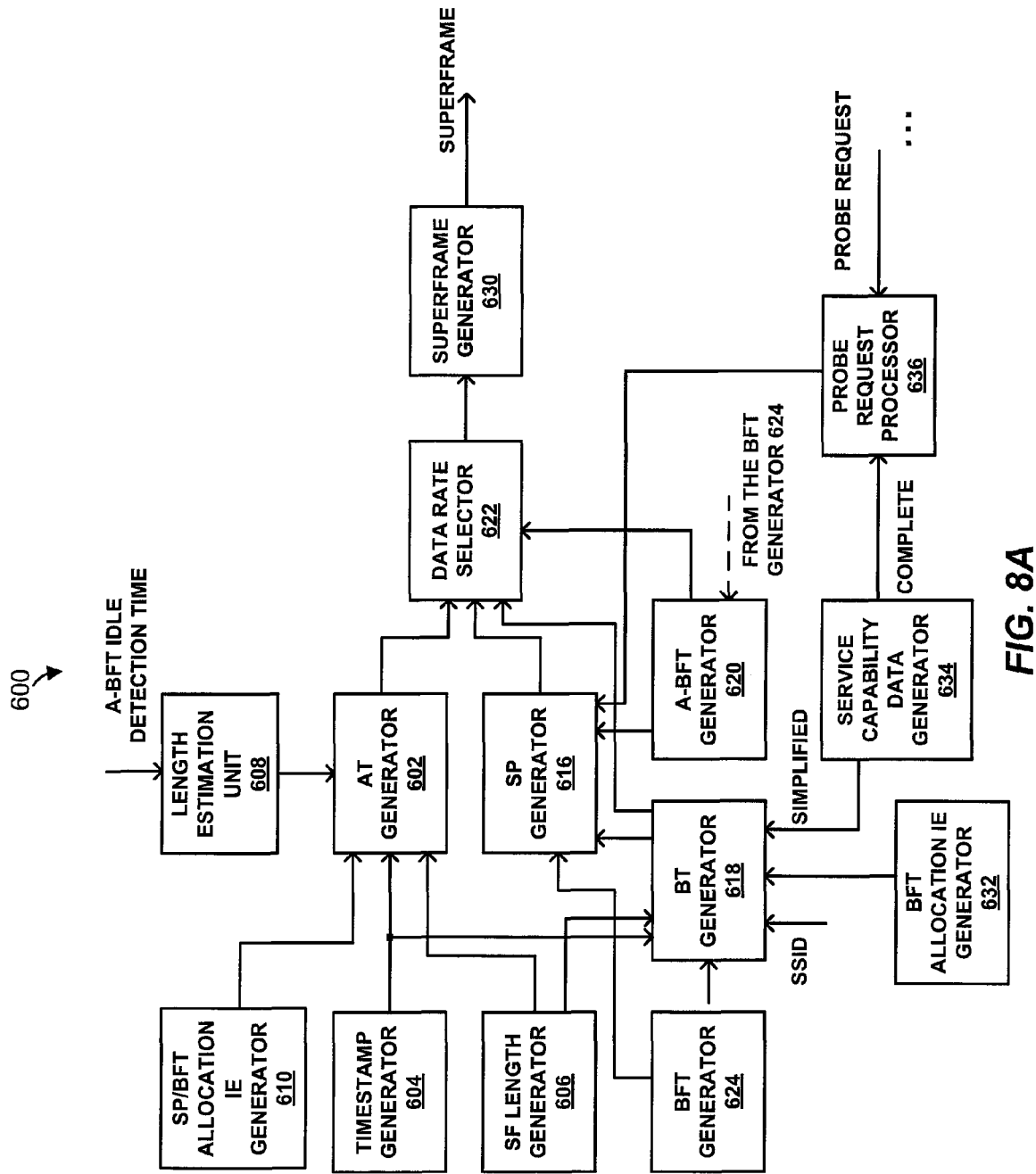
FIG. 8A is a block diagram of an example communication frame generator that can be included in the PCP illustrated in FIG. 2.

FIG. 8A is a block diagram of an example communication frame generator 600 that can generate announcement, beacon, and BFT frames consistent with the formats discussed above. The communication frame generator 600 includes an AT timeslot generator 602 to generate announcement beacons such as the announcement beacons discussed with reference to FIGS. 5A-5E. The AT timeslot generator 602 can be operatively connected to a timestamp generator 604, a superframe length generator 604, a length estimation unit 608 to calculate TBTT or other parameters according to Equation 1, for example, a SP/BFT allocation IE generator to generate informational elements similar to the one illustrated in FIG. 5E, and other components that will be discussed subsequently. The communication frame generator 600 can be implemented using hardware components, software components, firmware components, or any combination thereof. In one implementation, the entire communication frame generator 600 is implemented as a set of computer instructions using a suitable programming language.

The communication frame generator 600 further includes an SP generator 616 to generate service period timeslots that can include discovery beacons and beamforming training information typically associated with A-BFT timeslots, as well as beamforming training data associated with BFTT timeslots. To this end, the SP generator 616 may communicate with a BT timeslot generator 618 and an A-BFT timeslot generator 620. As discussed above, discovery beacons and A-BFT data in some implementations can be transmitted during special SPs. Alternatively, each of the BT timeslot generator 618 and the A-BFT timeslot generator 620 can directly format the respective AT and A-BFT timeslots of a corresponding superframe. Further, a BFT generator 624 can be coupled to the modules 618, 620, and 616 to supply BFT frames to be transmitted during BT timeslots, A-BFT timeslots, or BFTT timeslots, as discussed above.

Thus, as further illustrated in FIG. 8A, a data rate selector 622 can receive data to be transmitted during AT, BT, A-BFT, BFTT, and other timeslots from the generators 602 and 604 only, or from each of the generators 602, 604, 618, and 620. The data rate selector 622 can apply a low rate of data transmission to BT timeslots and a high rate of data transmission to other timeslots. Upon applying an appropriate data rate, the data rate selector 622 can supply the timeslots to a superframe generator 630 to generate a superframe that includes some or all of BT timeslots, AT timeslots, A-BFT timeslots, BFTT timeslots, etc.

With continued reference to FIG. 8A, the communication frame generator 600 can also include a BFT allocation IE generator 632 to generate informational elements similar or identical to those discussed with reference to FIG. 6A. Further, a service capability data generator 634 can supply simplified capability bitmasks to the BT generator 618 as well as complete capability data to a probe request processor 636.

Figure 8B:
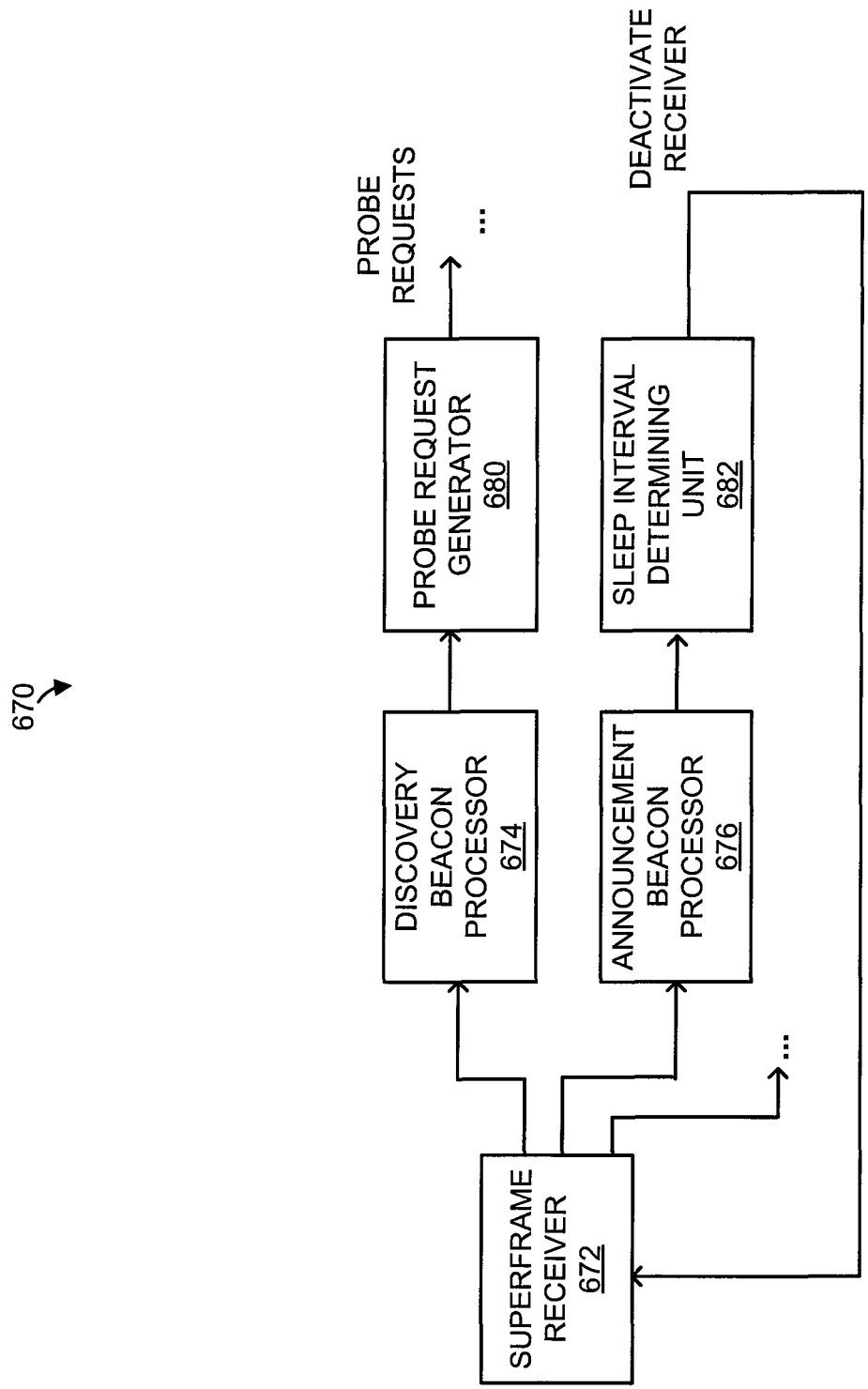
FIG. 8B is a block diagram of an example communication superframe processor that may included in one or both devices illustrated in FIG. 2.

FIG. 8B illustrates an example communication superframe processor 670 that can process communication superframes discussed above. For example, the communication superframe processor 670 may be used in one or both of the devices or stations 54 and 56. The communication superframe processor 670 includes a superframe receiver 672 to selectively listen to discovery beacons, announcement beacons, and other timeslots. The superframe receiver 672 is communicatively coupled to a discovery beacon processor 674 and an announcement beacon processor 676 to which the superframe receiver 672 supplies data received during BT timeslots and AT timeslots, respectively. The superframe receiver 672 can also supply data received in other timeslots to other modules.

Using discovery beacons received from the superframe receiver 672, the discovery beacon processor 674 can determine reduced service capability data, for example, and communicate with a probe request generator 680 to generate probe requests for obtaining additional (or complete) service capability data. Meanwhile, the announcement beacon processor 676 can determine a sleep interval (e.g., the duration of one or both of BT and A-BFT timeslots) when the corresponding station is associated with the network, and supply a signal to deactivate the receiver (e.g., an antenna circuit) during the sleep interval. In some cases, an information element specifying the starting time of the next AT timeslot or the sleep interval can be included in a discovery beacon.

Similar to the communication frame generator 60, the communication superframe processor 670 can be implemented using hardware components, software components, firmware components, or a combination thereof.

Figure 9:
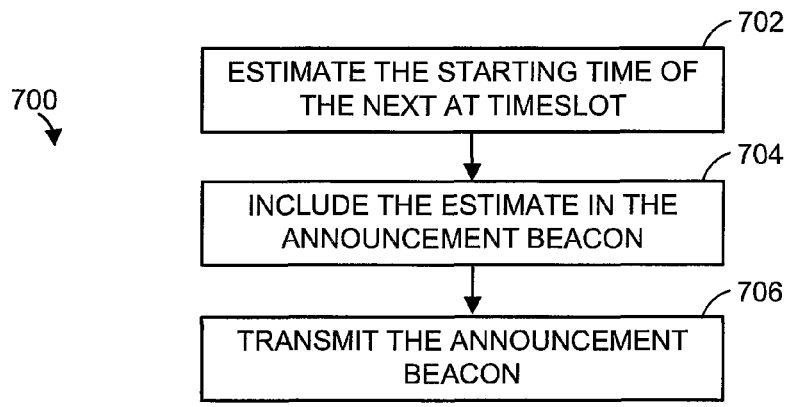
FIG. 9 is a flow diagram of an example method for including superframe timing information in an announcement beacon.
Figure 10:
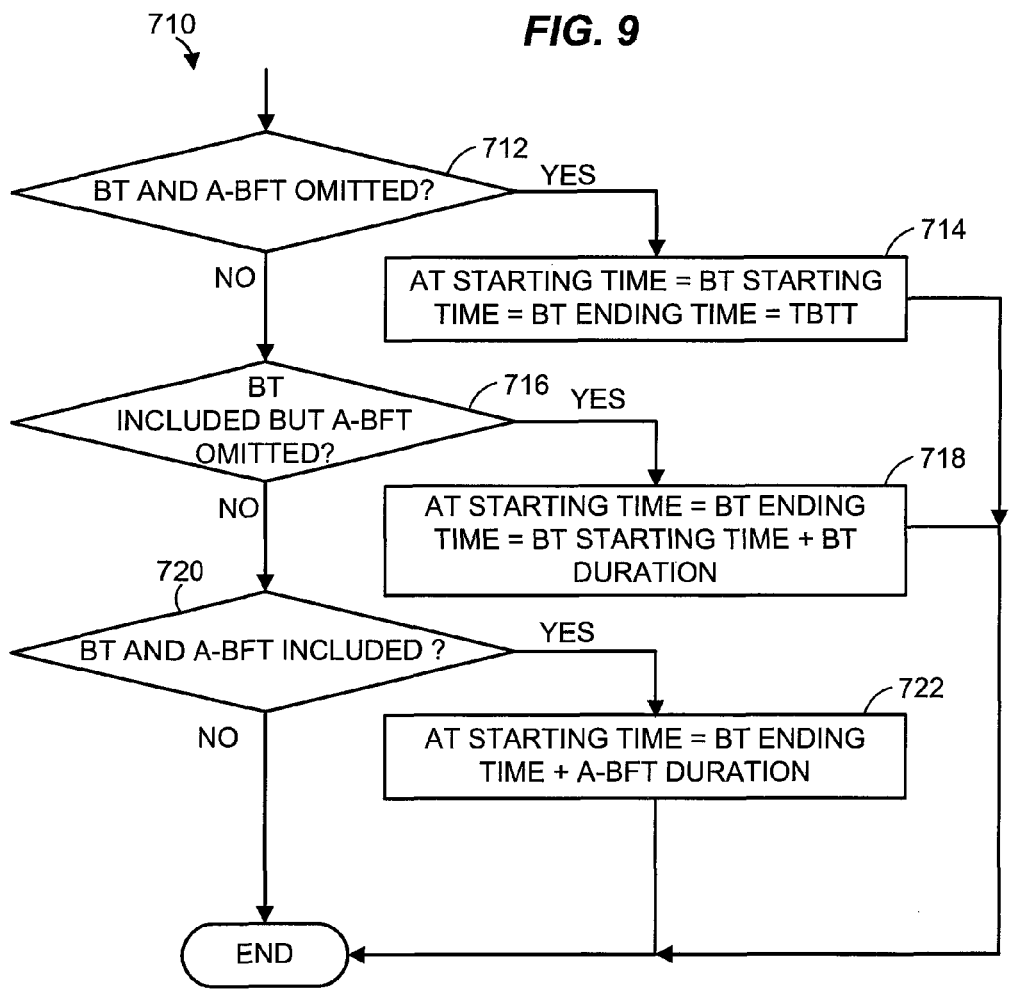
FIG. 10 is a flow diagram of an example method for generating superframe timing information in an announcement beacon.

Now referring to FIGS. 9 and 10, at least some of the components illustrated in FIG. 8 can implement the example methods 700 and 710. For example, the AT timeslot generator 602 can implement the method 700 to generate timing information to be included in an announcement beacon and, in particular, the method 710 as a routine for generating a time offset to be included in such timing information. It is to be understood, however, other alternative methods may also be implemented.

Referring now to FIG. 9, at block 702, a starting time of the next AT timeslot is estimated. At block 704, the beacon interval length is included in an announcement beacon. At block 706, the announcement beacon is transmitted.

Referring now to FIG. 10, at block 712, it is determined whether the BT and A-BFT timeslots are to be omitted in the next superframe. If it is determined that the BT and A-BFT timeslots are to be omitted, the AT timeslot starting time for the next superframe is set to TBTT at block 714.

On the other hand, if it is determined at block 712 that both the BT and A-BFT timeslots are not to be omitted, the flow proceeds to block 716. At block 716, it is determined whether the BT timeslot is included and A-BFT timeslot is omitted in the next superframe. If yes, the flow proceeds to block 718 at which the AT starting time is set to the BT starting time plus the BT duration.

On the other hand, if it is determined at block 716 that it is not true that the BT timeslot is included and A-BFT timeslot is omitted, the flow proceeds to block 720. At block 720, it is determined whether both the BT and the A-BFT are included. If both the BT and the A-BFT are included, the AT starting time is set to the BT starting time plus the BT duration plus the A-BFT duration (block 722).

Figure 11:
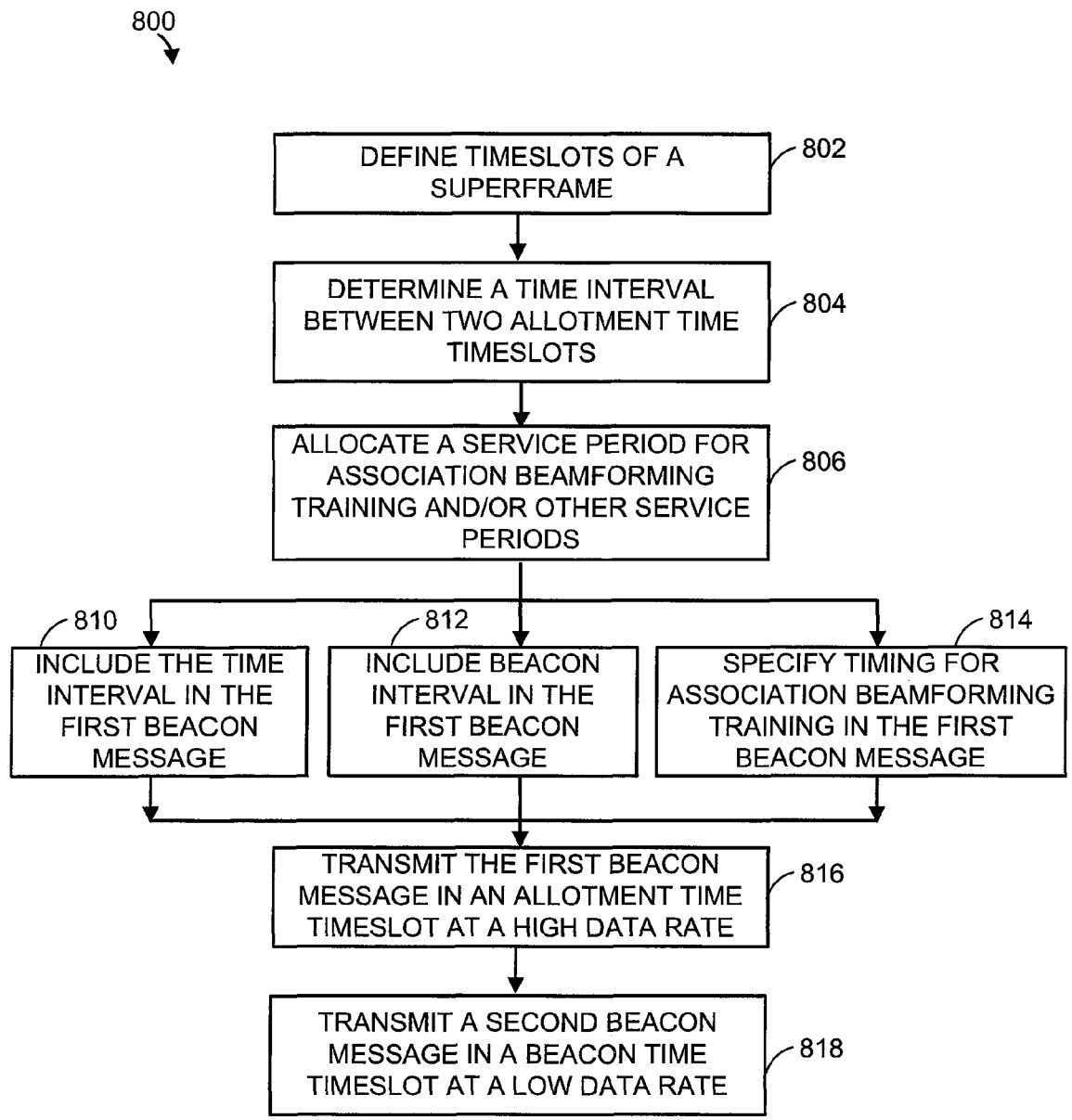
FIG. 11 is a flow diagram of an example method for generating timeslots of a communication superframe.

FIG. 11 illustrates a flow diagram of an example method 800 for generating timeslots of a communication superframe. At block 802, one or several timeslots of a first superframe are determined. These timeslots can be of the same or different lengths. At block 804, a time interval between two AT timeslots for transmitting announcement beacons in two consecutive superframes can be calculated precisely or approximately (i.e., estimated). Next, at block 806, an SP for association beamforming is scheduled within the first superframe. More specifically, the duration and the offset of the SP are determined.

Next, one or more blocks 810-814 can be executed to format a beacon such as an announcement beacon for use by stations already associated with the network. In block 810, the time interval determined at block 804 can be included in the announcement beacon. If block 812 is executed, beacon interval corresponding to the time difference between two consecutive beacons for use by unassociated and/or unbeamformed stations (i.e., a discovery beacon) can be included in the announcement beacon. Further, if block 814 is executed, the scheduling information determined at block 806 can be included in the announcement beacon.

At block 816, the announcement beacon is transmitted during a corresponding timeslot of the superframe, which may be the first timeslot in some implementations. The announcement beacon can be transmitted using a relatively high data rate. At block 818, the discovery beacon can be transmitted in another timeslot of the superframe at a relatively low data rate. Of course, as discussed above, the discovery beacon need not be transmitted in every superframe.

Figure 12:
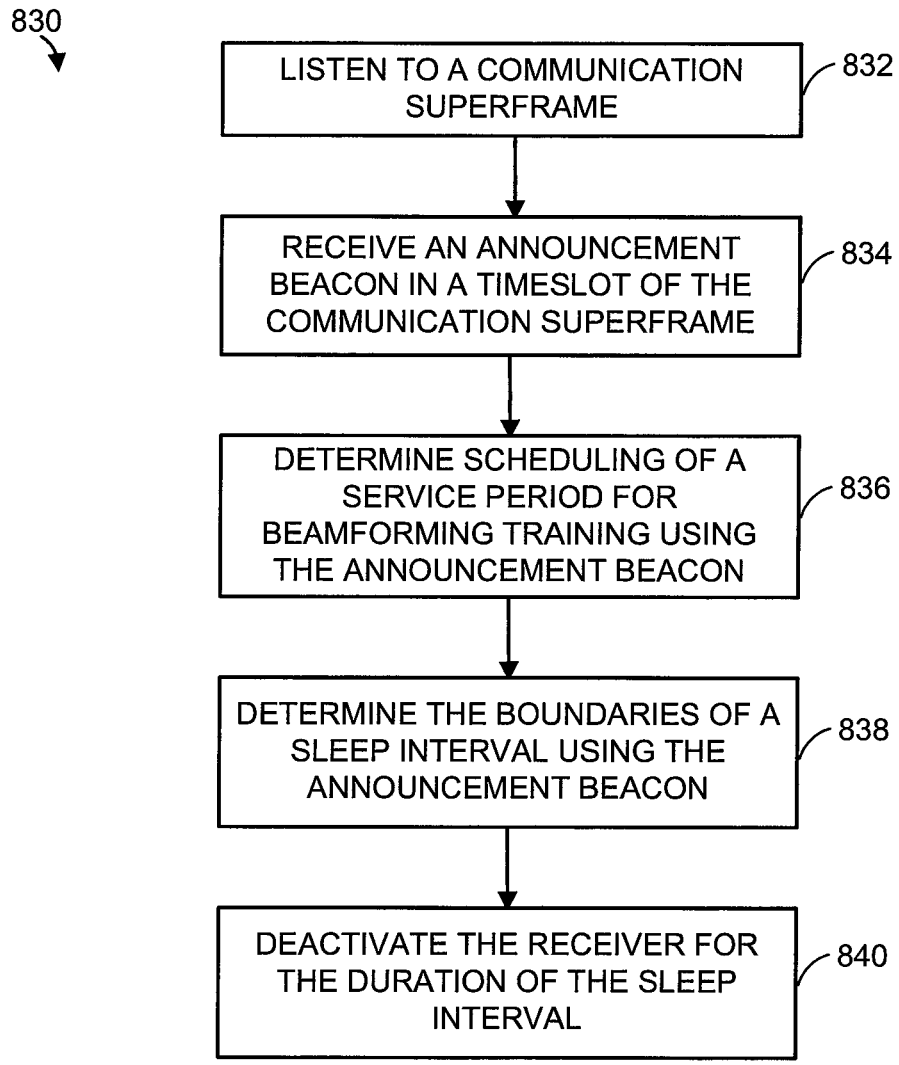
FIG. 12 is a flow diagram of an example method for processing a communication superframe.

FIG. 12 is a flow diagram of an example method 830 for processing a communication superframe. At block 832, a device can listen to one or several timeslots of a communication superframe, depending on the current state of the device. If the device is associated with the network, an announcement beacon carrying scheduling information can be received in a corresponding timeslot at block 834. In some embodiments, the announcement beacon can be processed at block 836 to determine the scheduling of one or several timeslots within the superframe. For example, the device can determine the beginning and the duration of a service period allocated for beamforming associated and previously beamformed stations. At block 838, the boundaries of a sleep interval including one or both of BT and A-BFT timeslots can be determined. If the BT and A-BFT timeslots are not adjacent, the boundaries of two intervals can be determined. Next, at block 840, the receiver of the device can be deactivated for the entire or partial duration of the sleep interval to conserve power.

Figure 13:
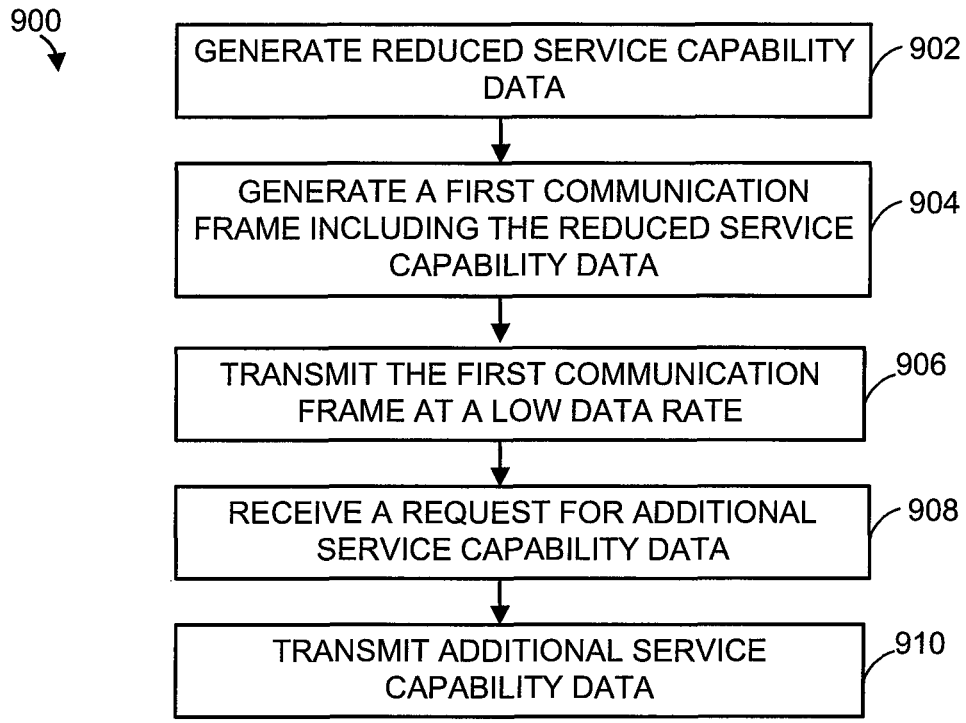
FIG. 13 is a flow diagram of an example method for transmitting service capability data in two or more communication frames.

FIG. 13 is a flow diagram of an example method 900 for transmitting service capability data. At block 902, a reduced data set is generated based on the available service capability data of the network. For example, the reduced data set can be a bitmap that includes only the essential data related to the capability settings of the network. At block 904, a first communication frame is generated to transmit the reduced service capability data. In at least some implementations, the first communication frame can be a discovery beacon transmitted at a low data rate. At block 906, the first communication frame is transmitted in a corresponding timeslot. At block 908, a probe request is received to request additional or complete service capability data. The probe request may be received during another timeslot associated with a higher data rate, if desired. At block 910, the additional service capability data is transmitted, formatted as a probe response communication frame, for example. It will be noted that the method 900 alternatively or additionally can be applied to transmitting other data, and that service capability data is discussed herein by way of example only.

Figure 14:
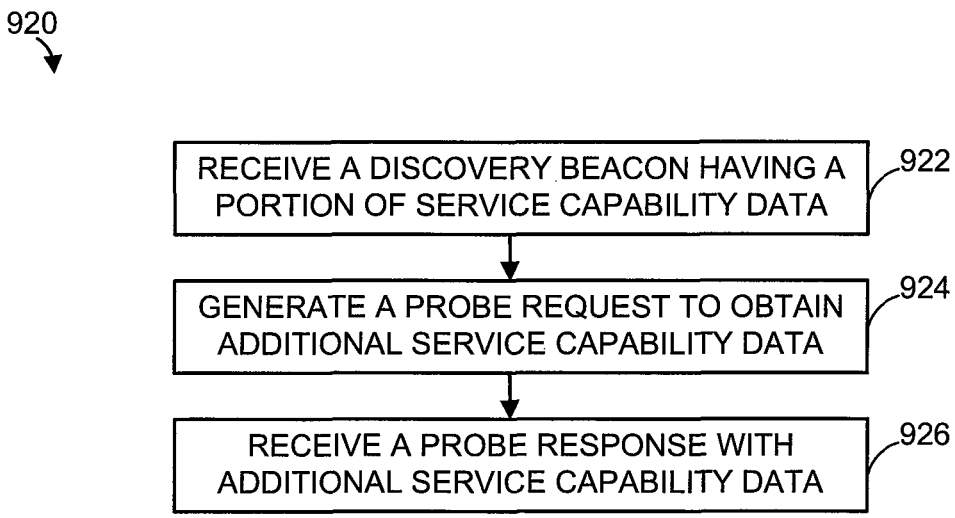
FIG. 14 is a flow diagram of an example method for processing a discovery beacon.

FIG. 14 is a flow diagram of an example method 920 for processing a discovery beacon. At block 922, a device unassociated with the network, for example, can receive a discovery beacon transmitted at a low data rate. The discovery beacon can include data descriptive of the network such as a reduced service capability bitmap, for example. At block 924, a probe request message (e.g., a communication frame) requesting additional service capability data can be generated. A probe response communication frame responsive to the probe request communication frame can be received at block 926, and the additional service capability data can be obtained from the probe response communication frame.

At least some of the blocks illustrated in FIGS. 9-14 can combined with other blocks or further divided. Further, some of the blocks illustrated in FIGS. 9-14 correspond to optional steps and can be omitted. Thus, a method for generating timeslots in one example implementation can include only the blocks 804, 810, and 816 (see FIG. 11), a method for processing a communication superframe can include only blocks 834, 836, and 840, etc.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for scheduling communication in a network, the method comprising:
   determining a duration of a beacon time (BT) timeslot to be included (i) in a next superframe and (ii) before an allocation time (AT) timeslot of the next superframe, wherein the BT timeslot is for transmitting one or more discovery beacons, and wherein the AT timeslot is for transmitting one or more announcement beacons;
   determining a time within a scheduled timeslot for association beamforming training (A-BFT) at which one or more stations that are sleeping are to wake up, wherein the scheduled timeslot for A-BFT is in the next superframe and follows the BT timeslot; and
   generating a beacon to be transmitted during a timeslot of a current superframe, wherein the current superframe precedes the next superframe, and wherein the beacon includes information indicative of the time within the scheduled timeslot for A-BFT at which the one or more stations that are sleeping are to wake up to enable the one or more stations that have previously beamformed to sleep through at least a portion of the BT timeslot and at least a portion of the time period for A-BFT.

2. The method of claim 1, wherein generating a beacon to be transmitted during a timeslot of a current superframe includes generating an announcement beacon to be transmitted during an AT timeslot of the current superframe.

3. The method of claim 1, wherein determining the duration of the BT timeslot includes calculating the duration of the BT timeslot based at least on a discovery beacon size.

4. The method of claim 1, wherein the BT timeslot can be dynamically adjusted in response to network conditions.

5. The method of claim 1, wherein the timeslot for A-BFT can be dynamically adjusted in response to network conditions.

6. A method for receiving data via a communication channel using a receiver, the method comprising:
   processing a beacon received, from a base station, in a timeslot of a current superframe, wherein the beacon specifies at least a time within a scheduled timeslot for association beamforming training (A-BFT) at which one or more stations that are sleeping are to wake up, wherein the scheduled timeslot for A-BFT is in a next superframe and follows an end of a beacon time (BT) timeslot of the next superframe, wherein the BT timeslot of the next superframe is for transmitting one or more discovery beacons, and wherein the next superframe follows the current superframe;
   determining, based on at least the time within the scheduled timeslot for A-BFT timeslot specified in the beacon, a sleep interval that ends (i) after a beginning of the scheduled timeslot for A-BFT of the next superframe but (ii) before an end of the scheduled timeslot for A-BFT, and (iii) before an allotment time (AT) timeslot of the next superframe; and
   generating a signal to deactivate the receiver for the duration of the sleep interval.

7. The method of claim 6, wherein processing a beacon received in a timeslot of a current superframe includes processing an announcement beacon received in an AT timeslot of the current superframe, and wherein the announcement beacon further specifies scheduling of the current superframe.

8. The method of claim 7, further comprising, prior to processing the announcement beacon:
   joining a network provided by the base station; and
   beamforming with the base station.

9. The method of claim 6, wherein determining a sleep interval includes determining a sleep interval that spans an entirety of the BT timeslot of the next superframe.

10. The method of claim 6, wherein the timeslot for A-BFT of the next superframe can be dynamically adjusted by the base station in response to network conditions.

11. The method of claim 6, wherein the BT timeslot of the next superframe can be dynamically adjusted by the base station in response to network conditions.

12. An apparatus comprising:
   a beacon processor configured to process a beacon received, from a base station, in a timeslot of a current superframe, wherein the beacon specifies at least a time within a scheduled timeslot for association beamforming training (A-BFT) at which one or more stations that are sleeping are to wake up, wherein the scheduled timeslot for A-BFT is in a next superframe and follows an end of a beacon time (BT) timeslot of the next superframe, wherein the BT timeslot of the next superframe is for transmitting one or more discovery beacons, and wherein the next superframe follows the current superframe; and
   a sleep interval determining unit configured to
      determine, based on at least the time within the scheduled timeslot for A-BFT specified in the beacon, a sleep interval that ends (i) after a beginning of the scheduled timeslot for A-BFT of the next superframe but (ii) before an end of the scheduled timeslot for A-BFT, and (iii) before an allotment time (AT) timeslot of the next superframe, and
      generate a signal to deactivate the receiver for the duration of the sleep interval.

13. The apparatus of claim 12, wherein the beacon is an announcement beacon received in an AT timeslot of the current superframe, and wherein the announcement beacon further specifies scheduling of the current superframe.

14. The apparatus of claim 12, wherein the sleep interval spans an entirety of the BT timeslot of the next superframe.

15. The apparatus of claim 12, wherein the timeslot for A-BFT of the next superframe can be dynamically adjusted by the base station in response to network conditions.

16. The apparatus of claim 12, wherein the BT timeslot of the next superframe can be dynamically adjusted by the base station in response to network conditions.

* * * * *